(12) United States Patent
Nakachi et al.

(10) Patent No.: US 9,264,736 B2
(45) Date of Patent: Feb. 16, 2016

(54) ENCODING METHOD, DECODING METHOD, ENCODING DEVICE, AND DECODING DEVICE

(75) Inventors: Takayuki Nakachi, Kanagawa (JP); Tomoko Sawabe, Kanagawa (JP); Tetsurou Fuji, Kanagawa-ken (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 3105 days.

(21) Appl. No.: 10/512,075

(22) PCT Filed: Jan. 13, 2004

(86) PCT No.: PCT/JP2004/000154
§ 371 (c)(1),
(2), (4) Date: Nov. 5, 2004

(87) PCT Pub. No.: WO2004/064405
PCT Pub. Date: Jul. 29, 2004

(65) Prior Publication Data
US 2005/0244068 A1 Nov. 3, 2005

(30) Foreign Application Priority Data
Jan. 14, 2003 (JP) ................. 2003-006390

(51) Int. Cl.
*H04N 7/12* (2006.01)
*H04N 19/635* (2014.01)
*H04N 19/63* (2014.01)
*H04N 19/122* (2014.01)
(Continued)

(52) U.S. Cl.
CPC ........... *H04N 19/635* (2014.11); *H04N 19/122* (2014.11); *H04N 19/132* (2014.11);
(Continued)

(58) Field of Classification Search
CPC ... H04N 19/122; H04N 19/13; H04N 19/132; H04N 19/18; H04N 19/184; H04N 19/1883; H04N 19/61; H04N 19/63; H04N 19/635
See application file for complete search history.

(56) References Cited

U.S. PATENT DOCUMENTS 6,553,396 B1 * 4/2003 Fukuhara et al. ............. 708/313
6,587,590 B1 * 7/2003 Pan .............................. 382/250
(Continued)

FOREIGN PATENT DOCUMENTS

JP 2-113775 4/1990
JP 4-100379 4/1992
(Continued)

OTHER PUBLICATIONS

Yoshito Abe, et al., "Multiresolution Hierarchical Coding for High Definition Images", PCSJ95, Oct. 2, 1995, pp. 119-120 (with English abstract).
(Continued)

*Primary Examiner* — Nhon Diep
(74) *Attorney, Agent, or Firm* — Oblon, McClelland, Maier & Neustadt, L.L.P.

(57) ABSTRACT

A encoding apparatus decomposes an original image into M (M is an integer and M>2) uniform subbands, and encodes the decomposed signals by using an embedded type entropy encoding method. A decoding apparatus receives the coded data encoded by the encoding apparatus, extracts N signals from the coded data from a low frequency component side in decomposed signals, decodes the N signals by using an entropy decoding method, and synthesizes the N decoded signals to obtain a decoded image of a resolution of N/M times (M and N are integers, and 1≤N≤M and M>2) that of an original image.

11 Claims, 30 Drawing Sheets

(51) Int. Cl.
  H04N 19/61 (2014.01)
  H04N 19/132 (2014.01)
  H04N 19/18 (2014.01)
  H04N 19/184 (2014.01)
  H04N 19/169 (2014.01)
  H04N 19/13 (2014.01)

(52) U.S. Cl.
  CPC ............ *H04N 19/18* (2014.11); *H04N 19/184* (2014.11); *H04N 19/1883* (2014.11); *H04N 19/61* (2014.11); *H04N 19/63* (2014.11); *H04N 19/13* (2014.11)

(56) References Cited

U.S. PATENT DOCUMENTS

| | | | | |
|---|---|---|---|---|
| 6,658,158 | B2 * | 12/2003 | Fukuhara et al. | 382/240 |
| 6,765,510 | B2 * | 7/2004 | Koyama et al. | 341/51 |
| 6,895,121 | B2 * | 5/2005 | Joshi et al. | 382/243 |
| 7,050,641 | B1 * | 5/2006 | Kharitonenko | 382/240 |
| 7,127,111 | B2 * | 10/2006 | Fukuhara et al. | 382/232 |
| 7,616,720 | B2 * | 11/2009 | Al-Adnani | 375/350 |
| 2005/0078820 | A1 * | 4/2005 | Hayashi | 380/37 |

FOREIGN PATENT DOCUMENTS

| | | |
|---|---|---|
| JP | 04-245863 | 9/1992 |
| JP | 2000-197052 | 7/2000 |
| JP | 2002-165098 | 6/2002 |
| WO | WO 02/50772 A1 | 6/2002 |

OTHER PUBLICATIONS

Edited by Institute of Image Information and Television Engineers, "MPEG", Ohmsha, pp. 69-132 1996.

ISO/IEC 15444-1 JPEG2000 part I: Core coding system, Annexes A-E, pp. 57-114 2000.

Hsiang, Shih-Ta et al. "Embedded video coding using invertible motion compensated 3-D subband/wavelet filter bank", Signal Processing: Image Communication, vol. 16, pp. 705-724 2001.

Vaidyanathan, P.P. "Multirate Systems and Filter Banks", Prentice Hall, pp. 145-148, 816-848 1993.

Ono, F. et al. "Basic Technologies on International Image Coding Standards", CORONA Publishing, pp. 71-97 1998.

Akutsu, Yukie et al. "A Evaluation Measure of Resolution Conversions with Orthogonal Transform, Filter Bank or Wavelet Transform", Technical Report of IEICE, DSP93-26, pp. 17-24, (with English abstract & partial English translation) 1993.

ISO/IEC 13818-2 Generic Coding of Moving Pictures and Associated Audio, pp. i-xii 1993.

Fukuhara, Takahiro, "Kirei na Gazo ni JPEG-2000", Nikkei Electronics, No. 783, pp. 161 to 170, Nov. 20, 2000.

Yeong-An Jeong, et al., "A DCT-Based Embedded Image Coder Using Wavelet Structure of DCT for Very Low Bit Rate Video Codec", IEEE Transactions on Consumer Electronics, vol. 44, No. 3, XP011083638, Aug. 1, 1998, pp. 500-508.

Artur Przelaskowski, "Performance Evaluation of JPEG2000-Like Data Decomposition Schemes in Wavelet Codec", Institute of Electrical and Electronics Engineers, International Conference on Image Processing, vol. 3, XP010563468, Oct. 7, 2001, pp. 788-791.

Kwo-Jyr Wong, et al., "Image Compression with Fully-Decomposed Wavelet Transform", Military Communications Conference, Communications—Fusing Command, Control and Intelligence, IEEE, XP010060903, Oct. 11, 1992, pp. 1136-1140.

David Taubman, et al., "Embedded Block Coding in JPEG2000", Image Processing, IEEE, vol. 2, XP031534385, Sep. 10, 2000, pp. 33-36.

* cited by examiner

FIG.15
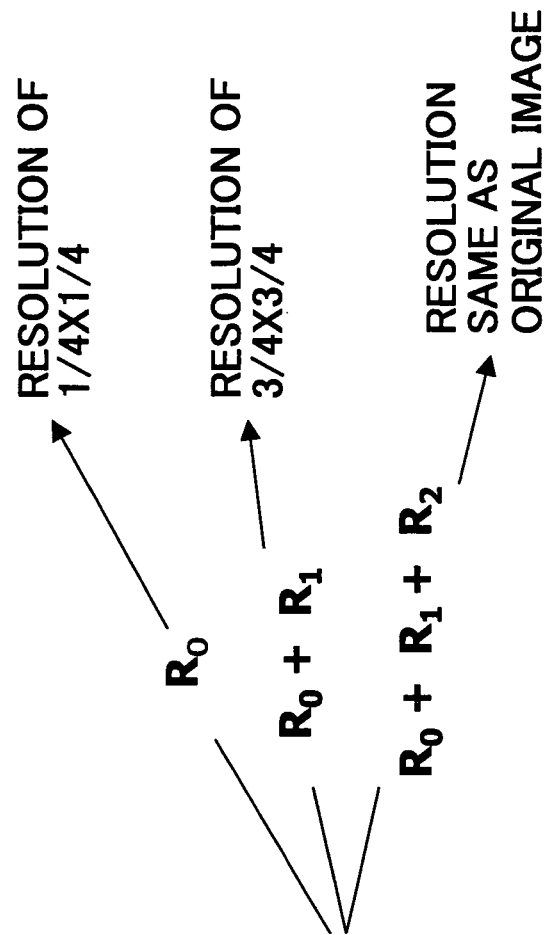
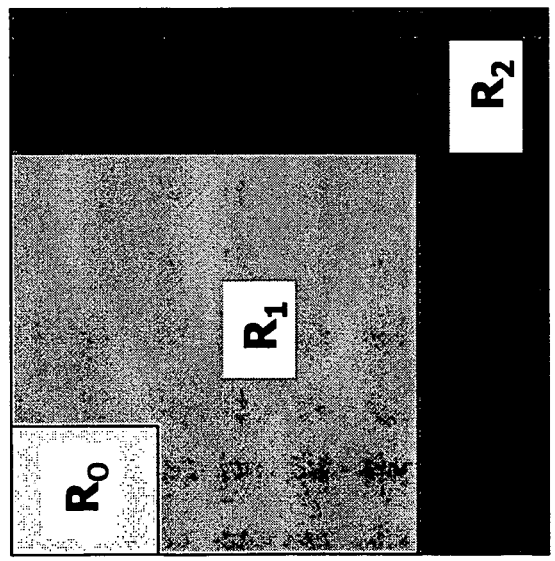

$$\text{NECESSARY RESOLUTION LEVEL} = \begin{pmatrix} R_{00}, & R_{01}, & \cdots & R_{0maxRY} \\ R_{10}, & R_{11}, & \cdots & R_{1maxRY} \\ & & \cdots & \\ R_{maxRX0}, & R_{maxRX1}, & \cdots & R_{maxRXmaxRY} \end{pmatrix}$$

FIG.23

| M × M DCT | M × M DCT | M × M DCT | M × M DCT |
|---|---|---|---|
| M × M DCT | M × M DCT | M × M DCT | M × M DCT |
| M × M DCT | M × M DCT | M × M DCT | M × M DCT |
| M × M DCT | M × M DCT | M × M DCT | M × M DCT |

ORIGINAL IMAGE : SIDBA STANDARD IMAGE
NUMBER OF PIXELS : 256*256 [pixels]
BIT WIDTH : 8[bit/pixel]
NUMBER OF BYTES : 65536 [bytes]

ORIGINAL IMAGE SIZE (256*256)

3/4 SCALE
RESOLUTION IMAGE
(192*192)

2/4 SCALE
RESOLUTION IMAGE
(128*128)

1/4 SCALE
RESOLUTION IMAGE
(64*64)

FIG.31

| RESOLUTION | 1 TIMES (256*256) | 3/4 TIMES (192*192) | 2/4 TIMES (128*128) | 1/4 TIMES (64*64) |
|---|---|---|---|---|
| CODE SIZE [Bytes] | 12705 (1.55bpp) | 10800 (2.34bpp) | 7706 (3.76bpp) | 2525 (4.93bpp) |
| PSNR [dB] | 39.96 | 39.24 | 37.20 | 33.75 |

ENCODING METHOD, DECODING METHOD, ENCODING DEVICE, AND DECODING DEVICE

TECHNICAL FIELD

The present invention relates to an encoding method, a decoding method, an encoding apparatus and a decoding apparatus. More particularly, the present invention relates to an encoding method, a decoding method, an encoding apparatus and a decoding apparatus for transmitting and storing images efficiently.

BACKGROUND ART

As international standards for image coding, (1) MPEG (Moving Picture Expert Group) for moving images (refer to "MPEG" edited by The Institute of Image Information and Television Engineers, Ohmsha, April 1996, for example);

(2) JPEG 2000 for still images (refer to "ISO/IEC 15444-1 JPEG2000 Part I: Core coding system, 2000-12-15", for example) are well known.

MPEG is a technique adopting motion compensation and DCT (discrete cosine transform) and realizes highly efficient encoding by efficiently removing frame correlation and correlation between frames. On the other hand, JPEG 2000 is a technique that uses wavelet transform and embedded type entropy encoding called EBCOT. Although coding efficiency of JPEG 2000 is inferior to that of MPEG since JPEG 2000 does not use correlation between frames, JPEG 2000 includes various effective functions such as spatial SNR (Signal-to-Noise Ratio) scalability and the like that are not included in MPEG. Motion JPEG 2000 that can be applied to moving images is also proposed, which Motion JPEG 2000 includes the same functions of JPEG 2000.

The scalability used in JPEG 2000 is called an embedded type, in which an encoder encodes data only once and does not need to regenerate compressed data for each resolution. Decoded images of various resolutions and SNRs can be obtained from one compressed file, so that the file size and computational complexity can be decreased. FIG. 1 shows the resolution scalability function of JPEG 2000. When the resolution of the original image is K×L, the decoder can decode the image into an image of any resolution of $K/2^n \times L/2^n$.

By using the above-mentioned JPEG 2000, an image that has a smaller resolution than that of the original image can be restored. However, the resolution is limited to $1/2^n$ times (n is a positive integer) the original image. There is a problem in that, generally, the resolution of the image required in the decoding side is not limited to $1/2^n$ times the resolution of the original image.

DISCLOSURE OF THE INVENTION

The present invention is contrived in view of the above-mentioned problems. An object of the present invention is to provide technologies of embedded type encoding and decoding for obtaining decoded images having more general resolutions.

The above object is achieved by an encoding method for encoding an original image, including:

a decomposition step of decomposing an input original image into M (M is an integer and M>2) uniform subbands; and an encoding step of encoding signals, by using an embedded type entropy encoding method, obtained by decomposing the original image into uniform subbands.

According to the present invention, since the original image is decomposed into uniform subbands, and is encoded by using the embedded type entropy encoding method, an image of a resolution that is not limited to $1/2^n$ times the resolution of the original image can be obtained in a decoding side.

The encoded data obtained in the encoding step may include information of resolution levels defined in ascending order of subband in the decomposed subbands.

In addition, the coded data may include information of resolution levels for a vertical direction and a horizontal direction, respectively, in an image.

The above object is also achieved by an encoding method of encoding an original image, the encoding method including:

a transformation step of transforming an input original image into a plurality of coefficients by orthogonal transform; and an encoding step of encoding the coefficients by using an embedded type entropy encoding method.

The coded data obtained in the encoding step may include information of resolution levels defined in ascending order of frequency in frequency components corresponding to the coefficients.

The above object is also achieved by a decoding method of decoding coded data with a resolution of N/M times (M and N are integers, and 1≤N≤M and M>2) that of an original image, the decoding method comprising:

a decoding step of receiving the coded data that is encoded by decomposing the original image into M uniform subbands, extracting N signals from decomposed signals from a low frequency side, and decoding the N signals by using an entropy decoding method; and a bandwidth synthesizing step of synthesizing the N signals that are decoded.

The decoding method may further include a calculation step of obtaining a resolution of the original image and a predetermined resolution, and calculating the value N suitable for the predetermined resolution by using the resolution of the original image and the decomposition number M.

The above object is also achieved by a decoding method of decoding coded data with a resolution of N/M times (M and N are integers, and 1≤N≤M and M>2) that of an original image, the decoding method including:

a decoding step of receiving the coded data that is encoded by decomposing the original image into M coefficients of frequency components, extracting N signals from decomposed signals from a low frequency component side, and decoding the N signals by using an entropy decoding method; and a bandwidth synthesizing step of synthesizing the N signals that are decoded.

In addition, according to the present invention, an apparatus including parts configured to perform each step in the method is provided. Further, a program that causes a computer to perform each step in the method and a computer readable recording medium storing the program can be provided.

As mentioned above, according to the present invention, a decoded image having a resolution other than $1/2^n$ times the resolution of the original image can be obtained.

BRIEF DESCRIPTION OF THE DRAWINGS

FIG. 15 is a figure showing an example in which resolution levels are set at unequal intervals.

FIG. 23 is a figure for explaining a bandwidth decomposition method in the fifth embodiment.

FIG. 31 is a table showing code sizes and PSNR characteristics of decoded images in the simulation.

PREFERRED EMBODIMENTS FOR CARRYING OUT THE INVENTION

In the following, embodiments of the present invention are described with reference to figures. First, the resolution scalability function of the present invention is described.

Figure 1:
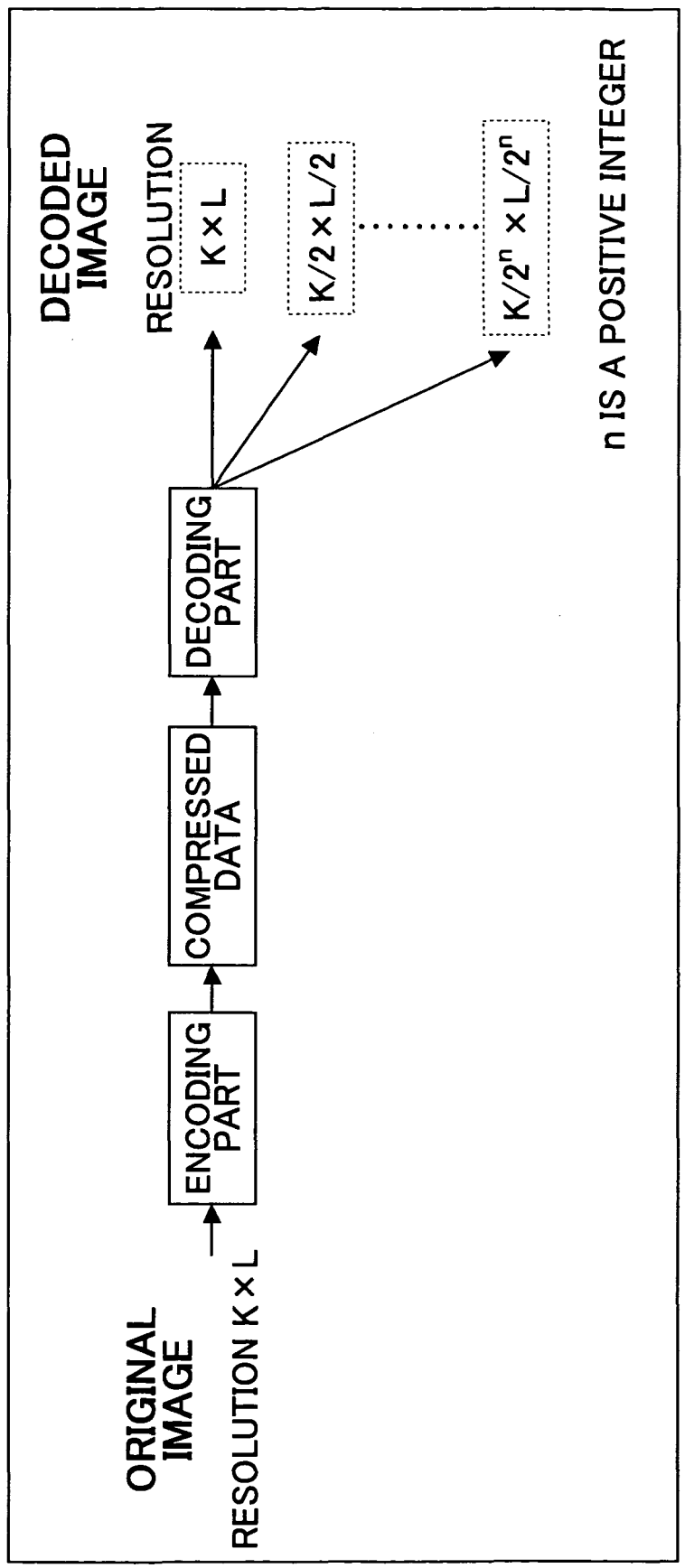
FIG. 1 is a figure showing JPEG 2000 resolution scalability.
Figure 2:
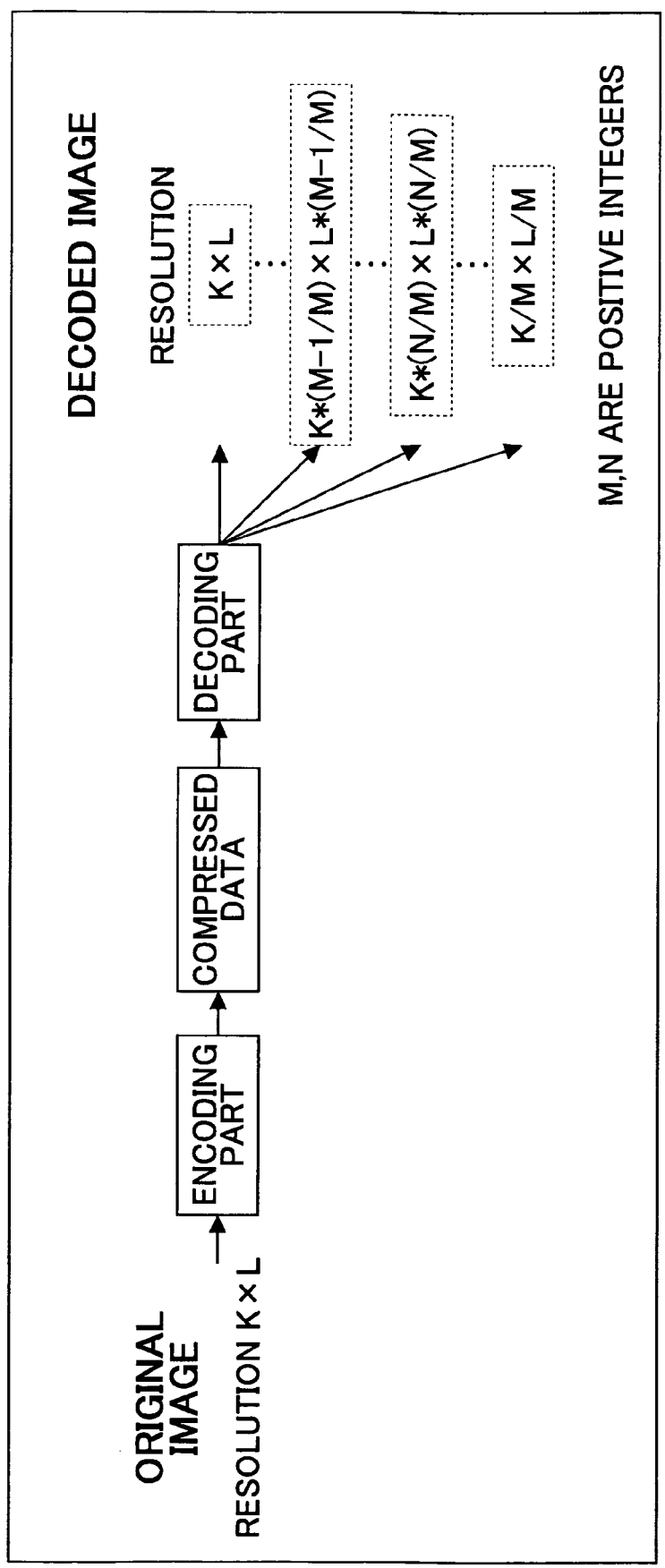
FIG. 2 shows a resolution scalability function that enables conversion of rational number scale in an embodiment of the present invention.

FIG. 2 shows the resolution scalability function according to an embodiment of the present invention. In the coding system shown in the figure, an encoding part encodes an image of K×L resolution so that one piece of compressed data is generated. In the decoding part, a bit stream that is a part of the compressed data is extracted so that an image that has a resolution of a rational number, that is N/M (each of M and N is an integer and 1≤N≤M and M>2) times that of the original image as shown in the figure can be obtained.

As to the location where a part of the coded code is extracted for obtaining the image having a resolution of the rational number times that of the original image, although the decoding part side performs the extraction in this example, the encoding part side may perform the extraction as another example. The framework of the other example is the same as that of the JPEG 2000. In addition, as still another example, a relay apparatus that is connected to the encoding part and to the decoding part by a transmission means may perform the extraction of a part of the coded code.

First Embodiment

Figure 3:
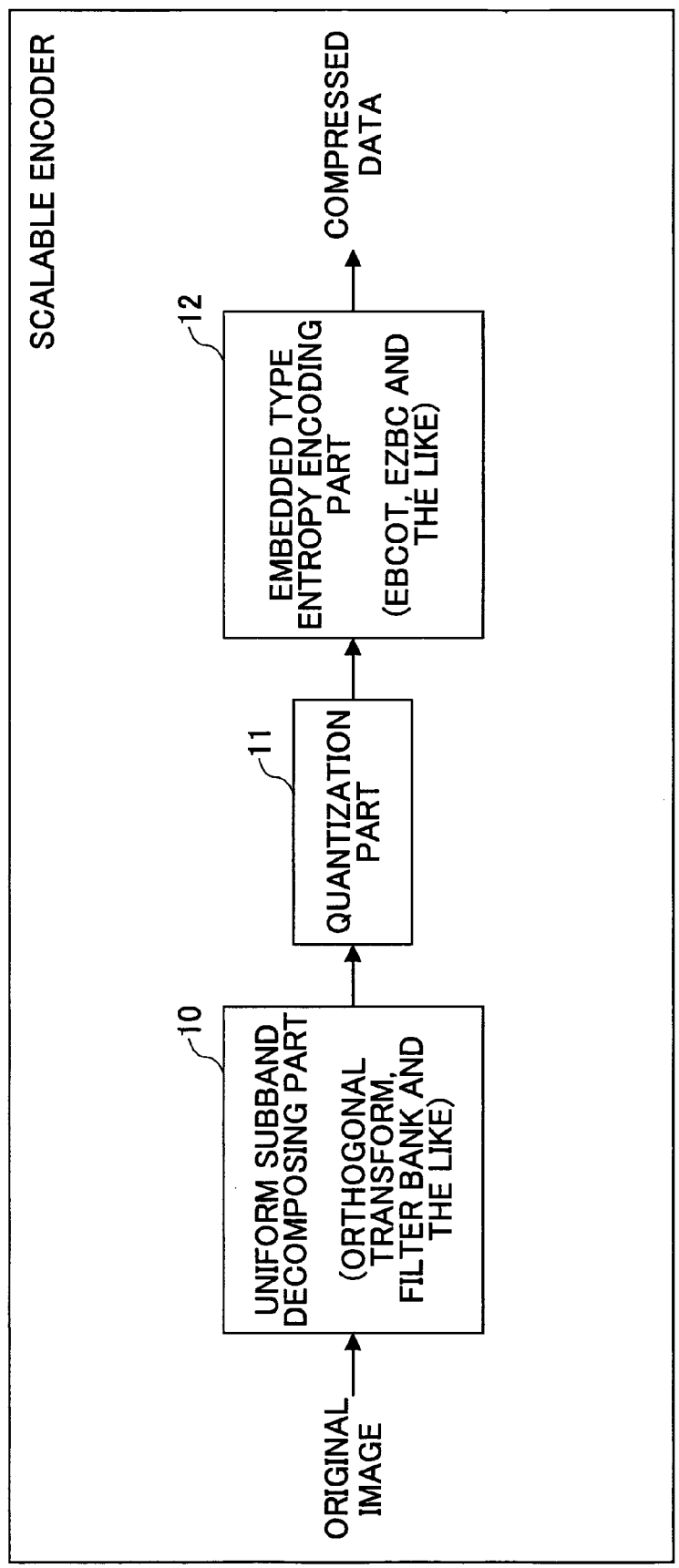
FIG. 3 is a basic block diagram of a scalable encoder in a first embodiment of the present invention.

FIG. 3 shows a basic structure of a scalable encoder for generating compressed data that can be decoded with any spatial resolution of a rational number times an original resolution in the first embodiment of the present invention.

Figure 4:
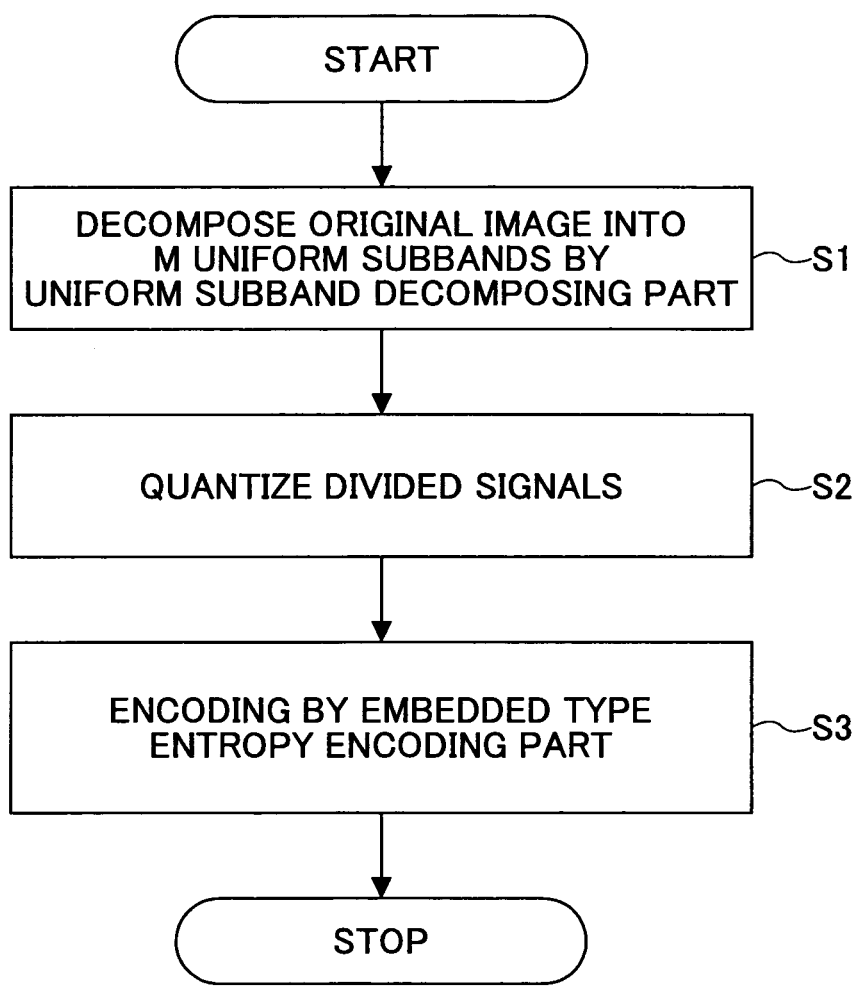
FIG. 4 is a flowchart for explaining an operation of the scalable encoder in the first embodiment.

The scalable encoder shown in the figure includes a uniform subband decomposition part 10, a quantization part 11, and an embedded type entropy encoding part 12. The operation of the scalable encoder is described with reference to a flowchart of FIG. 4.

An input original image is divided into M uniform subbands in the uniform subband decomposition part 10 (step 1). For dividing the bandwidth, a filter bank (P. Vaidyanathan, "multi-rate signal processing and filter bank", KAGAKU-GIJUTSU SHUPPAN, November 2001) or orthogonal transform (Fumitaka Ono, Yutaka Watanabe, "Basic Technology of International standard image coding", CORONA PUBLISHING CO., LTD, March 1998) can be used. The filter bank and the orthogonal transform are also referred to in Yukie Akutusu, Hiroyuki Kobayashi and Hitoshi Kiya "An Evaluation Measure of Resolution Conversions with Orthogonal Transform, Filter Bank or Wavelet Transform", Technical Report of IEICE, DSP 93-26, for example.

The decomposed signals are quantized in the quantization part (step 2). In the embedded type entropy encoding part 12, the compressed data are generated (step 3) by using an embedded type entropy encoding method such as EBCOT (ISO/IEC 15444-1 JPEG 2000 Part I: Core coding system, 2000-12-15) or EZBC(S. T. Hsiang and J. W. Woods, "Embedded video coding using invertible motion compensated 3-D subband/wavelet filter bank," Signal Processing: Image Communication, vol. 16, May 2001, pp. 705-724).

The embedded type entropy encoding part 12 is an entropy encoder for generating coded data that enables scalable decoding in the decoder side.

Details of the encoder that uses the filter bank as the uniform subband decomposition part 10 are described in the third embodiment, and details of the encoder that uses the orthogonal transform part as the uniform subband decomposition part 10 are described in the fifth embodiment.

Second Embodiment

Figure 5:
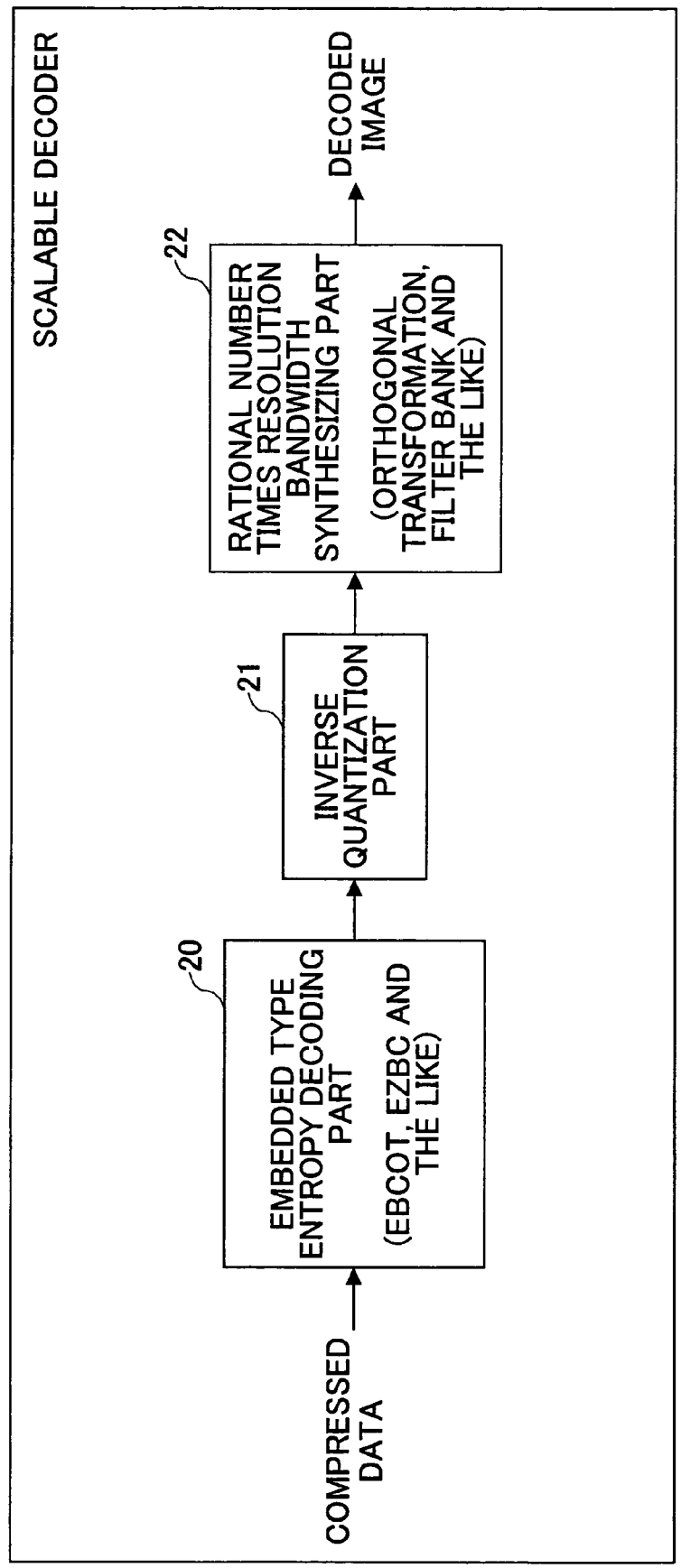
FIG. 5 shows a basic block diagram of a scalable decoder in a second embodiment of the present invention.

FIG. 5 shows a basic structure of a scalable decoder in the second embodiment of the present invention. The scalable decoder in the second embodiment is a decoder for decoding, with spatial resolution of any rational number times, the compressed data being generated by the encoder of the first embodiment.

Figure 6:
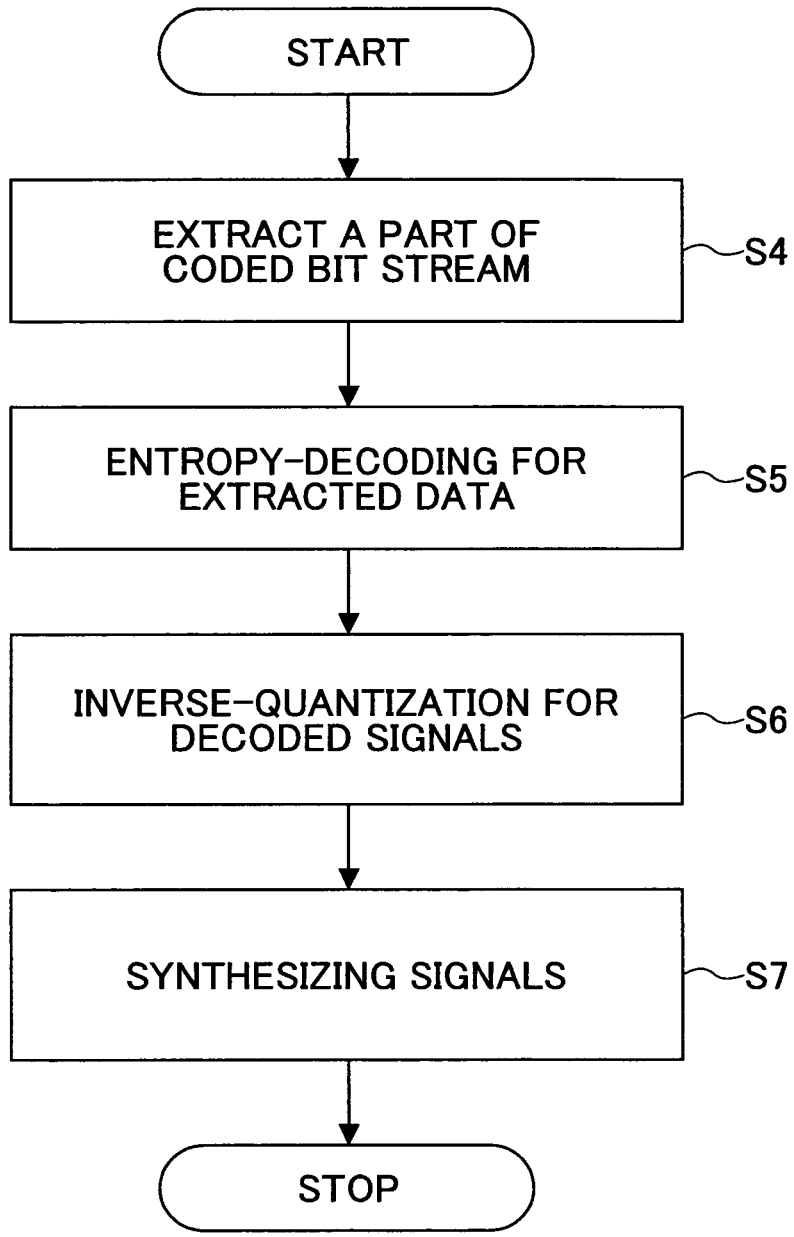
FIG. 6 is a flowchart for explaining the scalable decoder in the second embodiment of the present invention.

The scalable decoder shown in the figure includes an embedded type entropy decoding part 20, an inverse quantization part 21, and a bandwidth synthesizing part 22. The operation of the scalable decoder is described with reference to the flowchart shown in FIG. 6.

In the embedded type entropy decoding part 20, data of N/M bandwidths from the low frequency bandwidth side are extracted from the input compressed data (step 4) and entropy decoding is performed (step 5).

In the inverse quantization part 21, the signal decoded in the embedded type entropy decoding part is inverse-quantized (step 6). In the bandwidth synthesizing part 22, the signal that is inverse-quantized in the inverse quantization part 21 is synthesized so that an image is output (step 7).

As the bandwidth synthesizing part 22, a filter bank or an orthogonal transformer such as inverse DCT transform (IDCT) can be used in accordance with an image decomposing method in the encoder side. Details of the decoder that uses the filter bank are described in the fourth embodiment, and details of the decoder that uses the orthogonal transformer are described in the sixth embodiment.

Third Embodiment

In this embodiment, an encoder is described in which the filter bank is used as the uniform subband decomposition part, and EBCOT is used as the embedded type entropy encoding method.

Figure 7:
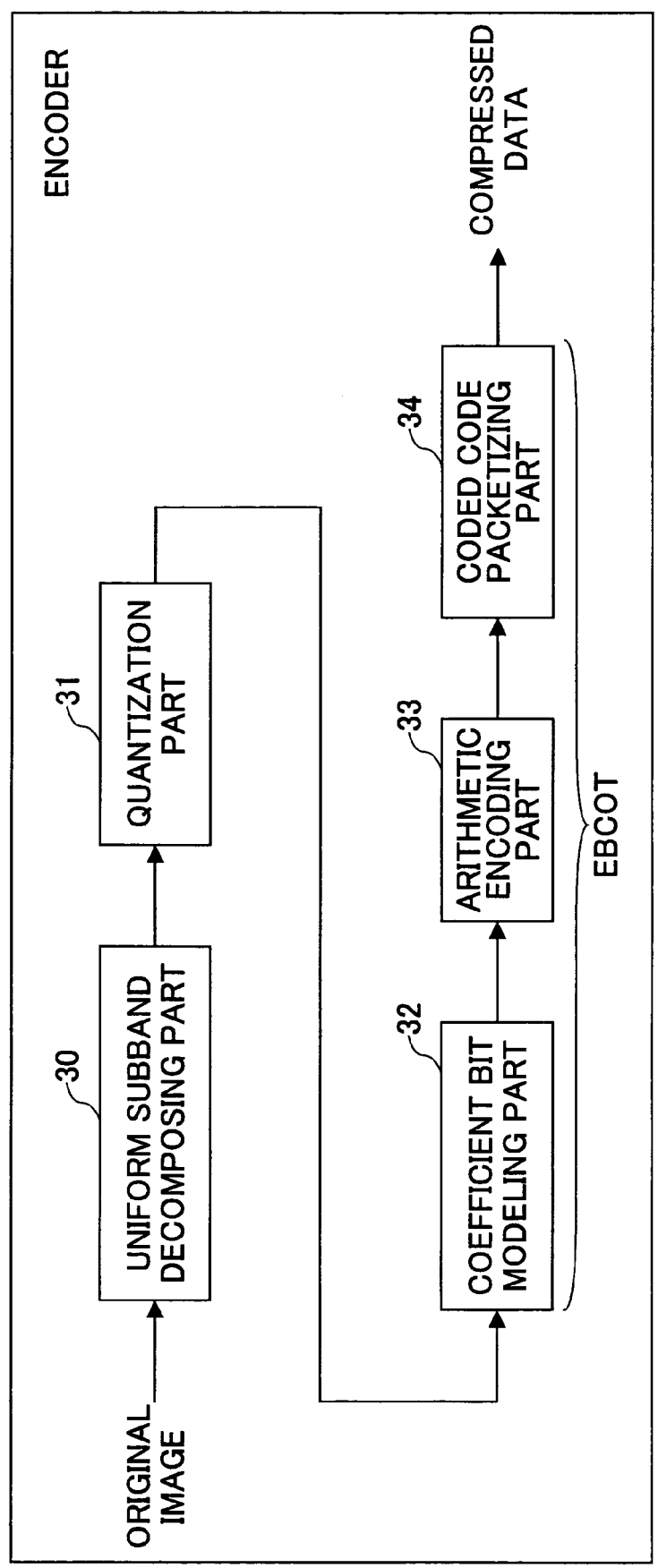
FIG. 7 is a block diagram of an encoder using a filter bank and EBCOT in a third embodiment of the present invention.

FIG. 7 shows a configuration of an encoder of the third embodiment of the present invention. The encoder shown in the figure includes a uniform subband decomposition part 30 that uses a uniform decomposing analysis filter bank, a quantization part 31 and embedded type entropy encoding parts 32-34.

Figure 8:
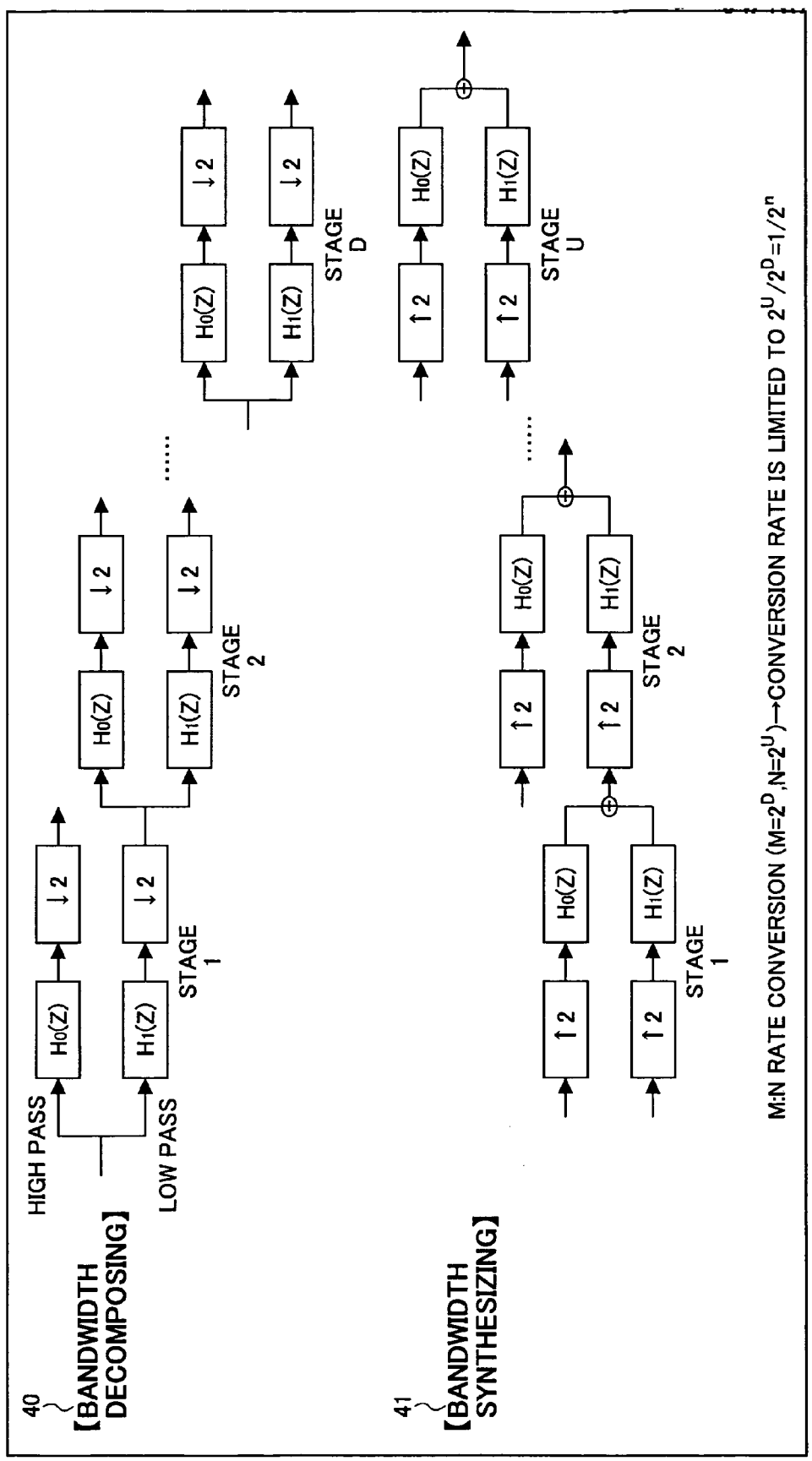
FIG. 8 is a figure for explaining Mallat decomposition.

In JPEG 2000, wavelet transform is used for bandwidth decomposition. In the wavelet transform, bandwidth decomposition is performed by using a decomposition method called "Mallat decomposition" shown in FIG. 8. In the Mallat decomposition, the input signal is decomposed into a plurality of subbands by repeatedly decomposing the input signal in the low frequency direction by using a dual decomposition filter of one dimension. As shown in the upper figure (40) in FIG. 8, by decomposing the image D times, the original image can be divided into an image having a spatial resolution of $1/2^n$ that of the original image. This process is performed in a horizontal direction and in a vertical direction, respectively. In the decoding side, as shown in the lower figure (41) in FIG. 8, the image is repeatedly decoded from the lower frequency side. By decoding U times, an image that has a spatial resolution of $2^U/2^D=1/2^n$ times that of the original image can be restored.

Figure 9:
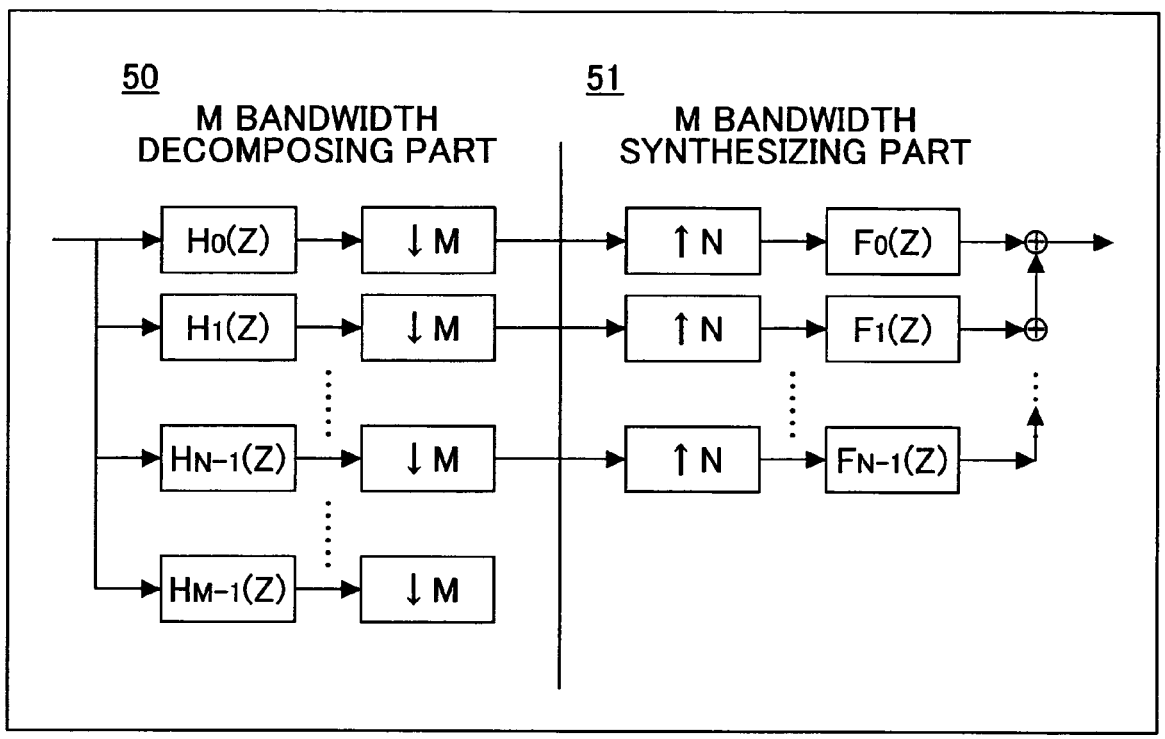
FIG. 9 is a figure for explaining N/M scale resolution conversion by using the filter bank in the third embodiment of the present invention.
Figure 10:
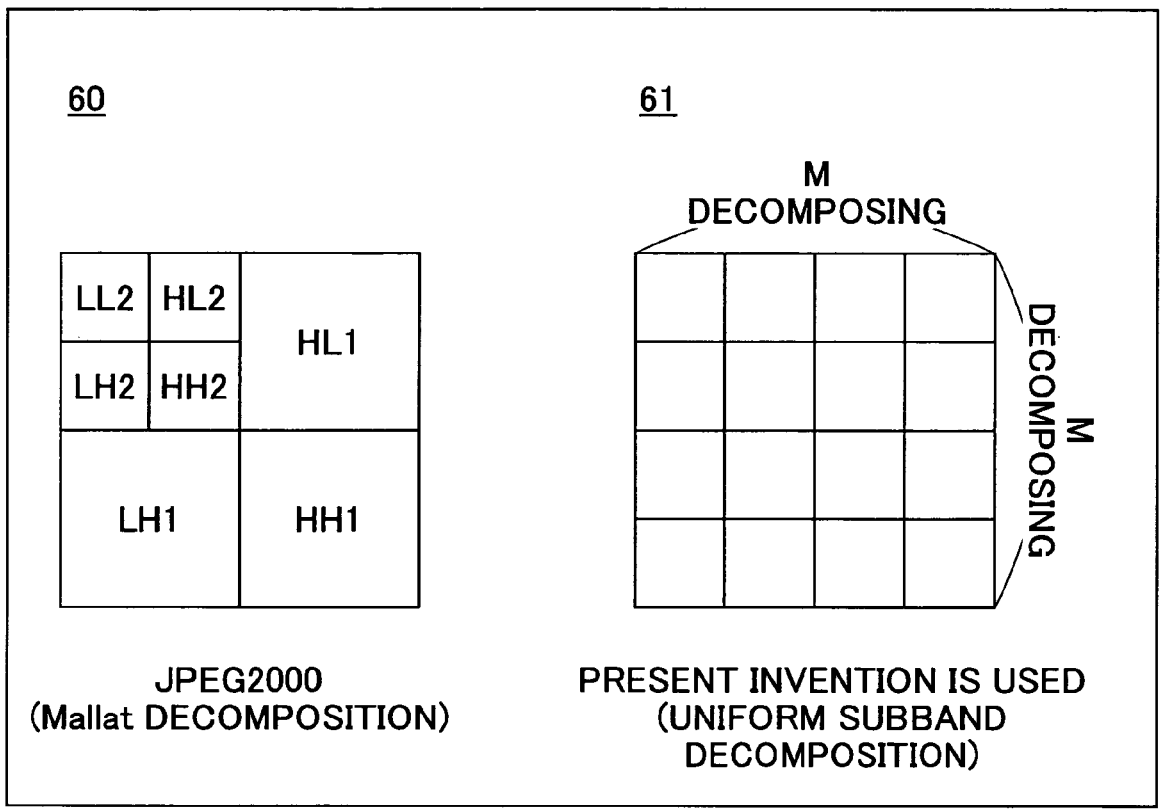
FIG. 10 is a figure for explaining Mallat decomposition and uniform subband decomposition in the third embodiment of the present invention.

On the other hand, according to the present invention, a uniform decomposition analysis filter bank shown in the left side (50) of FIG. 9 is used for bandwidth decomposition. In the uniform decomposition analysis filter bank 50, the original image is decomposed into M uniform subbands by using M filters having the same bandwidth. Final outputs are obtained by downsampling each output of the filters by 1/M. For comparison, FIG. 10 shows the Mallat decomposition (60) in JPEG 2000 and the uniform subband decomposition (61) of the present invention.

In the quantization part 31 in FIG. 7, the output signal from the uniform subband decomposition part 30 is quantized. Since, by using the entropy encoding part (EBCOT encoding processing part) 32-34, the amount of compressed data can be controlled without performing quantization, the quantization can be omitted.

EBCOT is one kind of embedded type entropy encoding method. In the entropy encoding part 32-34 by EBCOT, first, a coefficient bit modeling part 32 repeatedly decomposes an image by performing:

code block division
bit plane division
division into sub-planes (three paths) of each bit plane.

In the arithmetic encoding part 33, arithmetic encoding is performed in which path is a minimum unit. In the arithmetically encoded data, bits can be discarded wherein the path is a minimum unit (post quantization). Control of code amount can be performed only by the post processing. Then, in the coded code packetizing part 34, the arithmetically coded compressed data are packetized and are transmitted as code streams.

The spatial resolution and scalable coding such as SNR scalability can be realized by providing a certain priority to the path unit and by controlling time priority at the time of decoding. There are four types of priorities:

L: layer (SNR level)
R: spatial resolution level
P: precinct
C: color component

Figure 11:
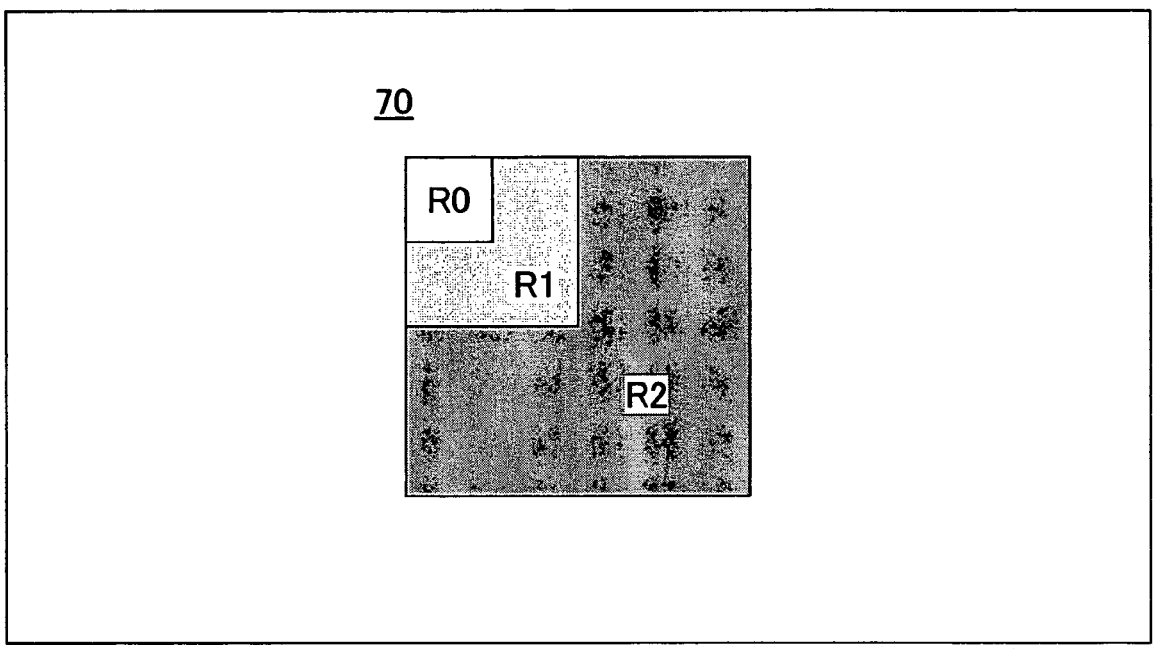
FIG. 11 is a figure for explaining spatial resolution levels of JPEG 2000 in the third embodiment of the present invention.

The layer is a standard based on SNR. In JPEG 2000, coded data can be decomposed from an upper layer to a lower layer. By decoding coded data from the upper layer to the lower layer in order, the quality of the image can be improved step by step. The spatial resolution level is for realizing scalability of spatial resolution. As shown in FIG. 10, when two levels of wavelet transform are performed, the spatial resolution level (70) is divided into three levels of $R_0$, $R_1$ and $R_2$ as shown in FIG. 11. The resolution level is used as one of the priorities at the time of decoding. It becomes possible to perform control for increasing the resolution from the minimum frequency band gradually. When each of RGB signals is encoded, the order of decoding for each of R, G, B can be selected. Further, decoding of a spatial location of an image (image in a specific region) can be performed first. By arranging the four priorities appropriately, the order at the time of decoding can be controlled so that the quality of reproduced image can be controlled. In JPEG 2000, four patterns are provided.

1) LRCP
2) RLCP
3) PCRL
4) CPRL

Figure 12:
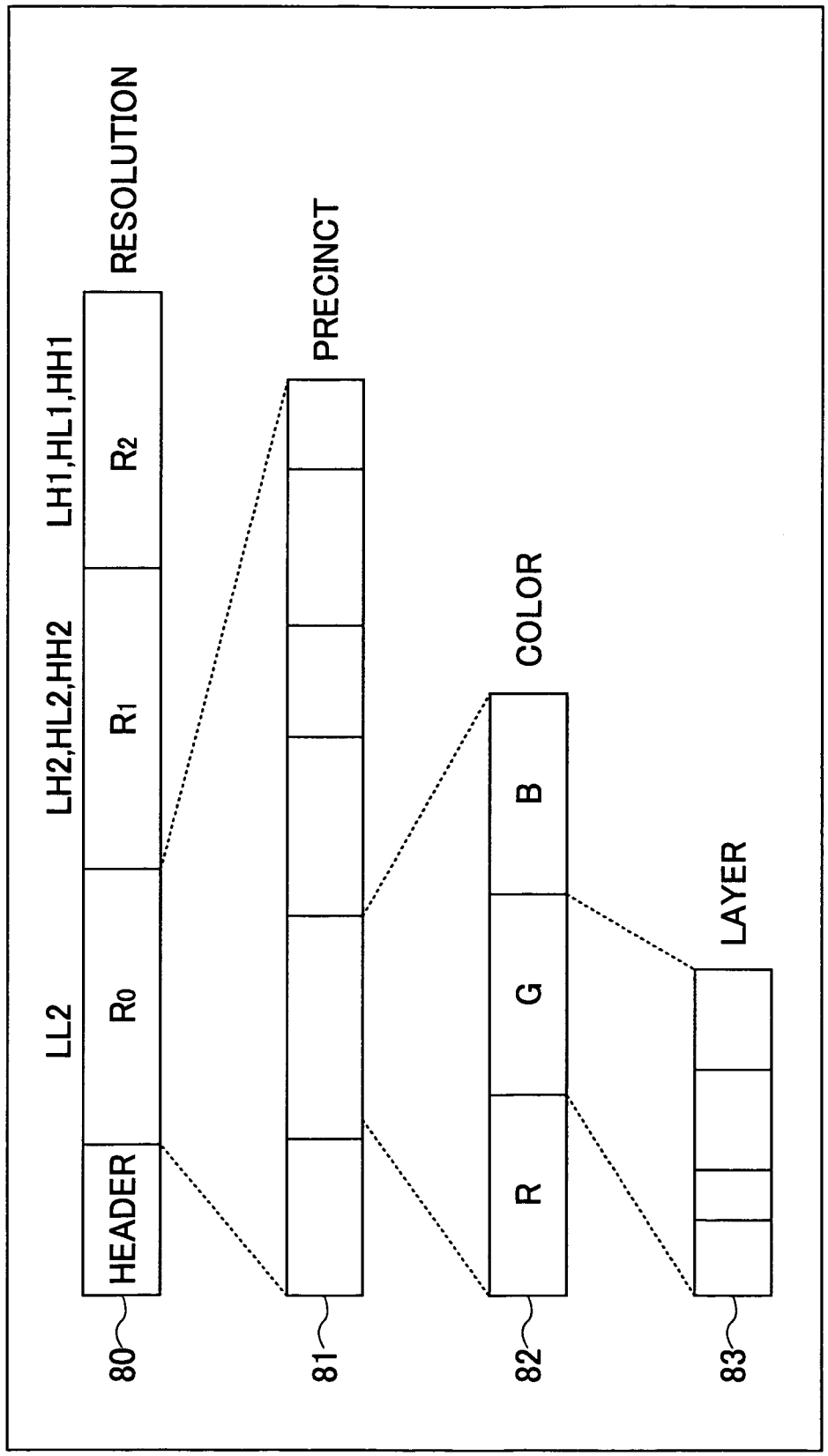
FIG. 12 is a figure for showing a RPCL data structure.

The spatial resolution scalability that enables stepwise decoding can be realized by the pattern of 2) RLCP. FIG. 12 shows the data structure. As shown in FIG. 12, the RPCL data structure that realizes the spatial resolution scalability includes resolution (80), precinct (81), color (82) and layer (83). By decoding $R_0$ data, an image of 1/4 resolution of the original image can be obtained; by decoding data in $R_1$, an image of 1/2 resolution of the original image can be obtained; and by decoding data in $R_2$, an image that has the same resolution the original image can be obtained.

Figure 13:
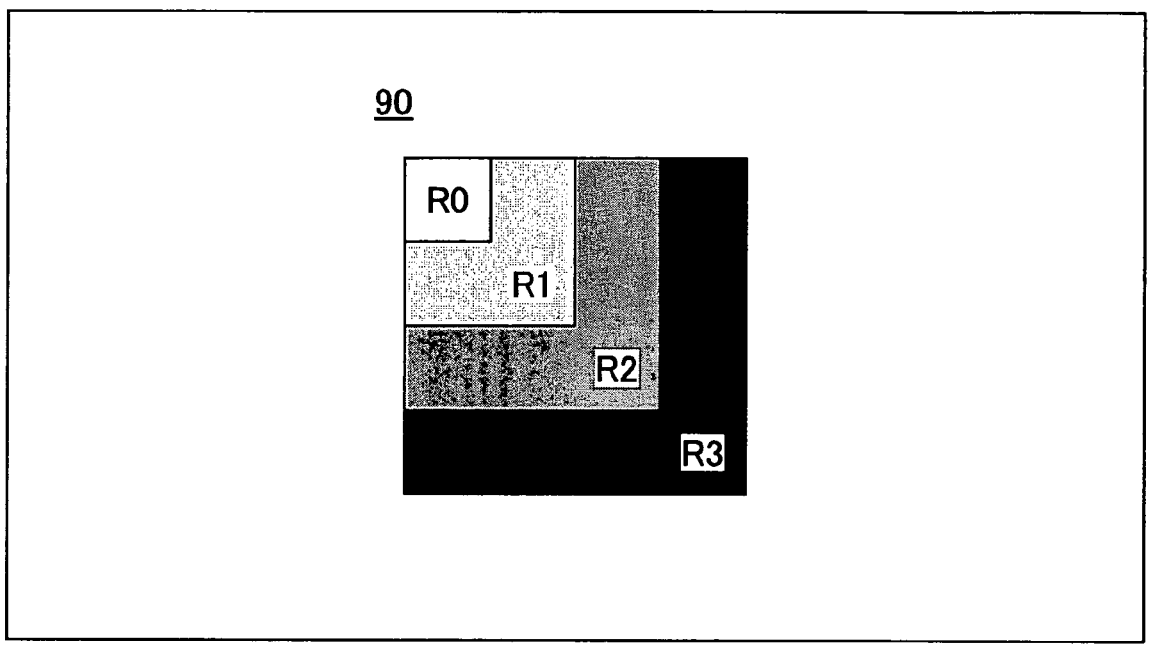
FIG. 13 is a figure for showing spatial resolution level in the third embodiment of the present invention.
Figure 14:
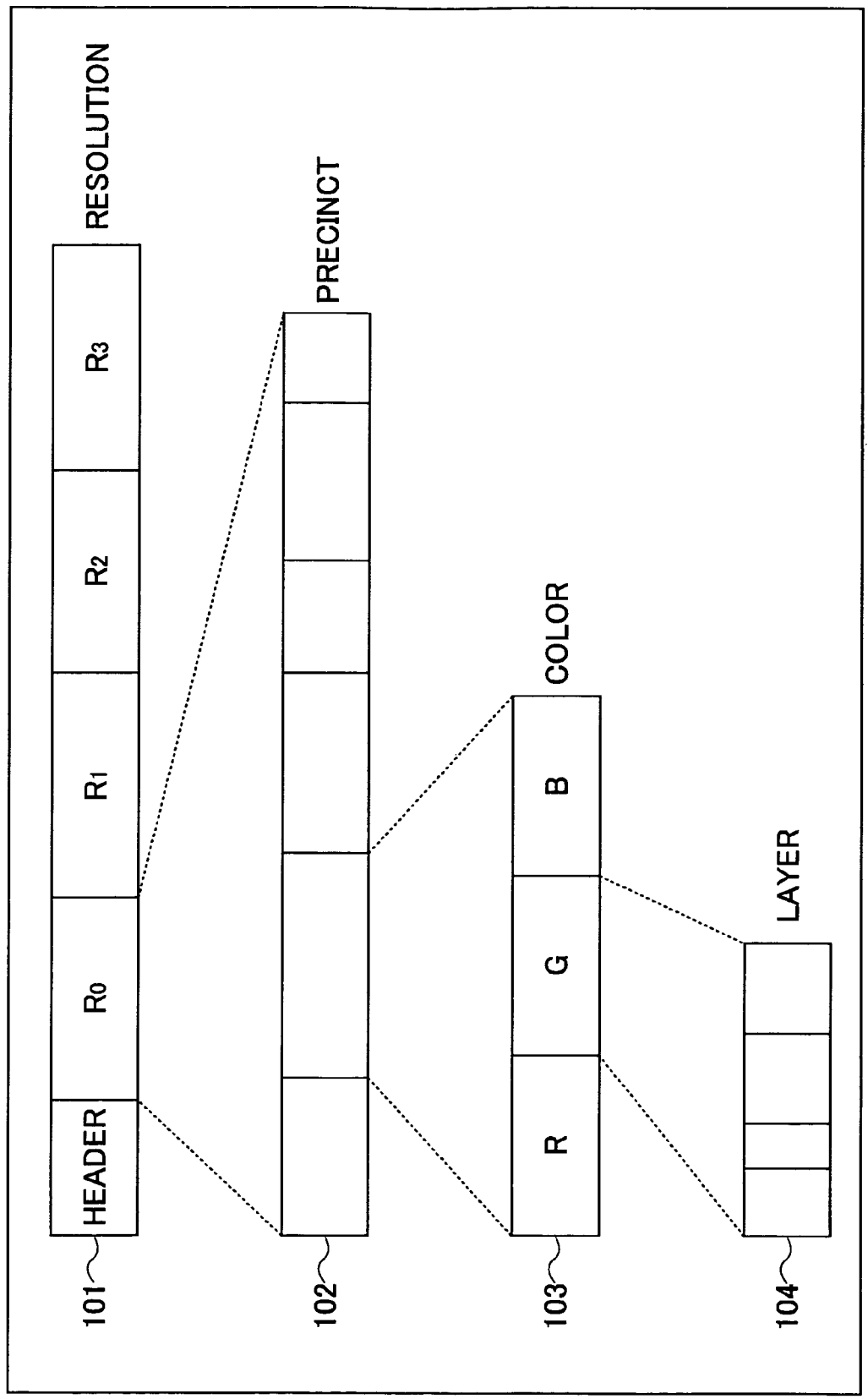
FIG. 14 is a figure showing the RPCL data structure for realizing the spatial resolution scalability in the third embodiment of the present invention.

In the present invention, for performing decoding with N/M times resolution against the original image, the resolution level (90) is set as shown in FIG. 13. At this time, as shown in FIG. 14, resolution (101), precinct (102), color (103) and layer (104) are set in the data structure. In a decoder, by decoding from $R_0$ to $R_1$, $R_2$, or $R_3$, images of 1/4, 2/4, 3/4 the original image and an image whose size is the same as that of the original image can be decoded. Therefore, an image 3/4 the size of the original image can be obtained, which is impossible using JPEG 2000.

The resolution levels can be set at uneven intervals as shown in FIG. 15. In this case, images of 1/4, 3/4 the original image and the same size image as the original image can be decoded.

In addition, it is possible for a conversion rate of a vertical direction of the image to be set to be different from a conversion rate of the horizontal direction of the image. In that case, the decomposition numbers are set for the vertical direction and for the horizontal direction, respectively, in the bandwidth decomposition part in the encoder, so that resolution levels are determined according to the numbers.

Figure 16:
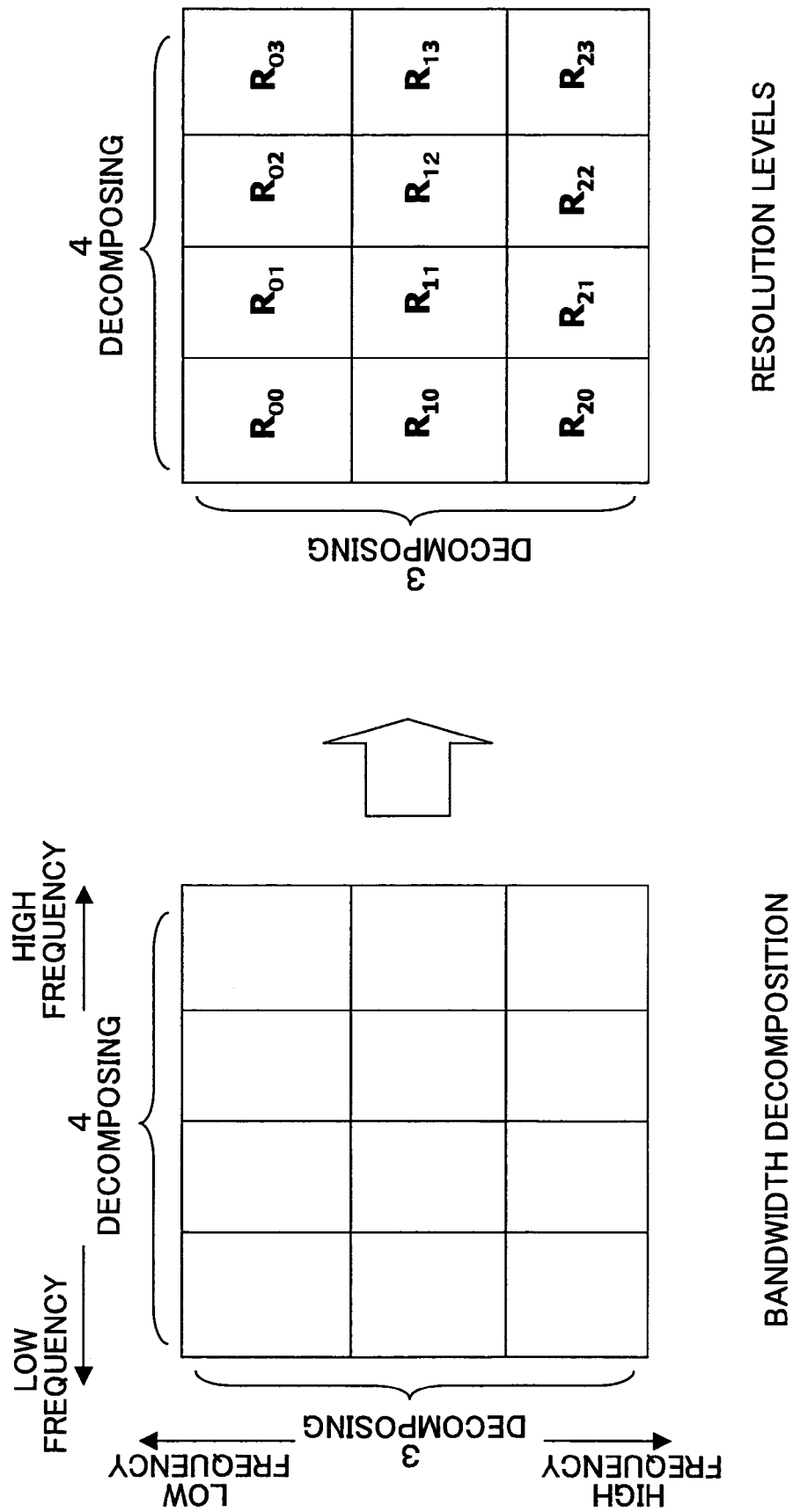
FIG. 16 shows a case where a conversion ratio in the vertical direction and a conversion ratio in the horizontal direction in an image are different.

For example, FIG. 16 shows a case where a decomposition number in the vertical direction is 3 and a decomposition number in the horizontal direction is 4. First, the image is divided into three in the vertical direction and into 4 in the horizontal direction by the uniform subband decomposition part 30. After that, for each of the decomposed subbands, each resolution level is set as shown in FIG. 16. In this case, in a decoding side, for example, if only $R_{00}$ is extracted, an image of vertically 1/3 and horizontally 1/4 can be decoded. In another example, by extracting $R_{00}$, $R_{01}$, $R_{02}$ Root $R_{11}$ and $R_{12}$, an image of 2/3 in the vertical direction and 3/4 in the horizontal direction, in which conversion ratios of vertical and horizontal directions are different, can be obtained.

As mentioned above, there are various patterns of resolution levels such as the case of equal intervals as shown in FIG. 13, the case of unequal intervals as shown in FIG. 15, or the case where the resolution levels of the vertical and horizontal directions are different as shown in FIG. 16. In any case, for enabling the decoder to decode the image, information on the resolution level is written in the header in the data structure of RLCP shown in FIG. 14 and the like.

Information items on the resolution level written in the header are shown in the following.
(1) XY: 1 or 0
(2) Decomposition Level: M
(3) Number of Resolution Levels: $L_R$
(4) Number of subbands included in Resolution Level i: Number_R(i) (i=0, 1, ..., $L_R$-1)

The information item of (1) is a flag for determining whether resolution levels of the vertical direction (X) and the horizontal direction (Y) are different. If they are different, the flag is 1, and if they are the same, the flag is 0. The information item of (2) indicates the number of bandwidth decomposition levels. The information item of (3) indicates the number of resolution levels. The information item of (4) is added only when $M \neq L_R$, and indicates the number of subbands included in the resolution level R(i).

If the resolution levels of the vertical direction and the horizontal direction are different, information of the above-mentioned (2), (3) and (4) is written for the vertical direction and the horizontal direction, respectively, in the order from the vertical direction to the horizontal direction.

For example, when resolution levels are provided as shown in FIG. 13, FIG. 15 and FIG. 16 (right side) respectively, the header information is as follows:

[In the case of FIG. 13]
(1) XY=0
(2) M=4
(3) $L_R$=4
[In the case of FIG. 15]
(1) XY=0
(2) M=4
(3) $L_R$=3
(4) Number_R(0)=1, Number_R(1)=2, Number_R(2)=1
[In the case of FIG. 16]
(1) XY=1
(2) M=3
(3) $L_R$=3
(4) M=4
(5) $L_R$=4

Fourth Embodiment

In this embodiment, a decoder is described in which a filter bank is used as the bandwidth synthesizing part and EBCOT is used as the embedded type entropy encoding part.

Figure 17:
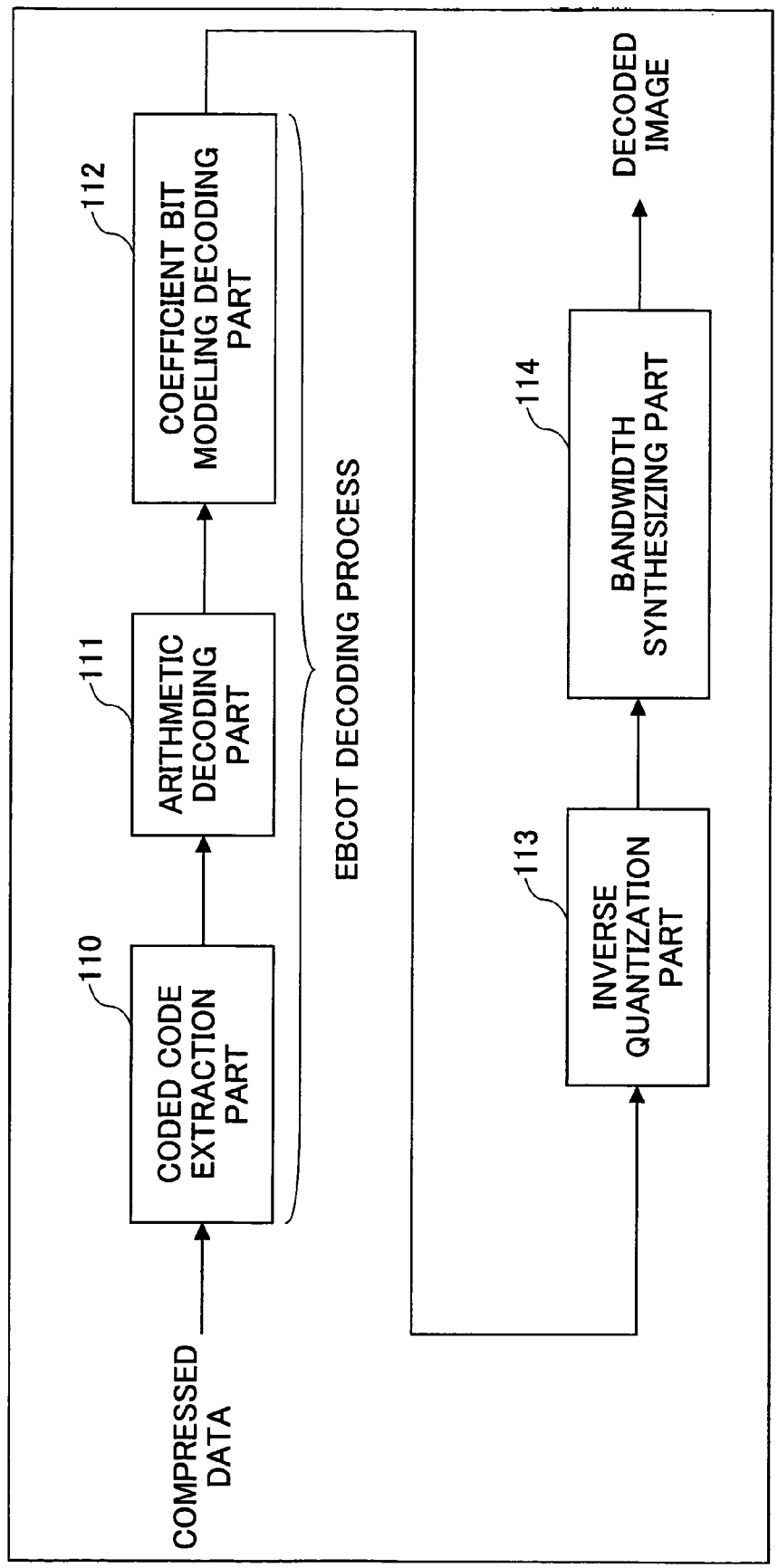
FIG. 17 is a block diagram of a decoder using a filter bank and EBCOT in a fourth embodiment of the present invention.

FIG. 17 shows a configuration of the decoder of the fourth embodiment. The decoder decodes the compressed data encoded in the before-mentioned third embodiment so as to output a decoded image.

The decoder shown in the figure includes a decoding part (EBCOT decoding processing part) 110-112 of embedded type entropy encoding EBCOT, an inverse quantization part 113, and a bandwidth synthesizing part 114 by using a uniform decomposition synthesizing filter bank.

The decoding part includes a coded code extraction part 110, an arithmetical decoding part 111, and a coefficient bit modeling decoding part 112.

Figure 18:
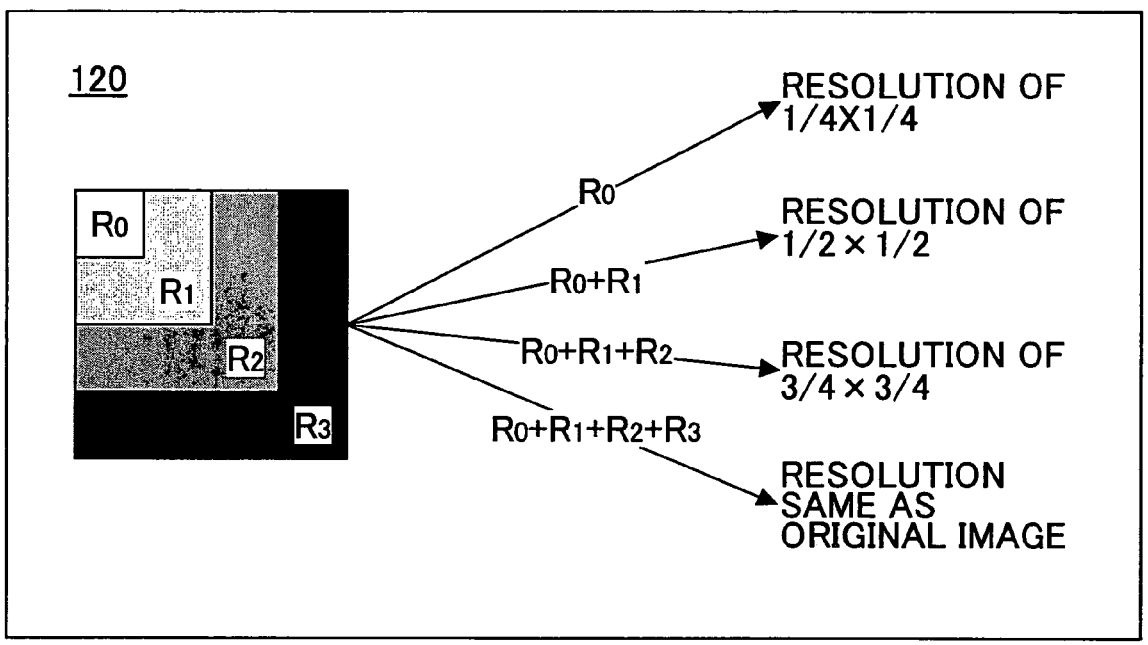
FIG. 18 shows relationships between resolution levels and resolutions in the fourth embodiment of the present invention.

The coded code extraction part 110 extracts data to which priorities are assigned in encoding by an amount necessary for decoding. FIG. 18 shows relationships (120) between resolutions of the decoded image and the resolution levels. To obtain an image one fourth the size of the original image, only $R_0$ is extracted. To obtain an image two fourth the size of the original image, resolution levels of $R_0$ and $R_1$ are extracted. To obtain an image three fourths the size of the original image, resolution levels of $R_0$ and $R_1$ and $R_2$ are extracted. To obtain an image of the same size as the original image, all of the resolution levels $R_0$, $R_1$, $R_2$ and $R_3$ are extracted. The extracted compressed data are arithmetically-decoded in the arithmetic decoding part 111, are coefficient-bit-modeling decoded in the coefficient bit modeling decoding part 112, and are inverse-quantized in the inverse quantization part 113. After that, the data are input into the bandwidth synthesizing part 114.

Figure 19:
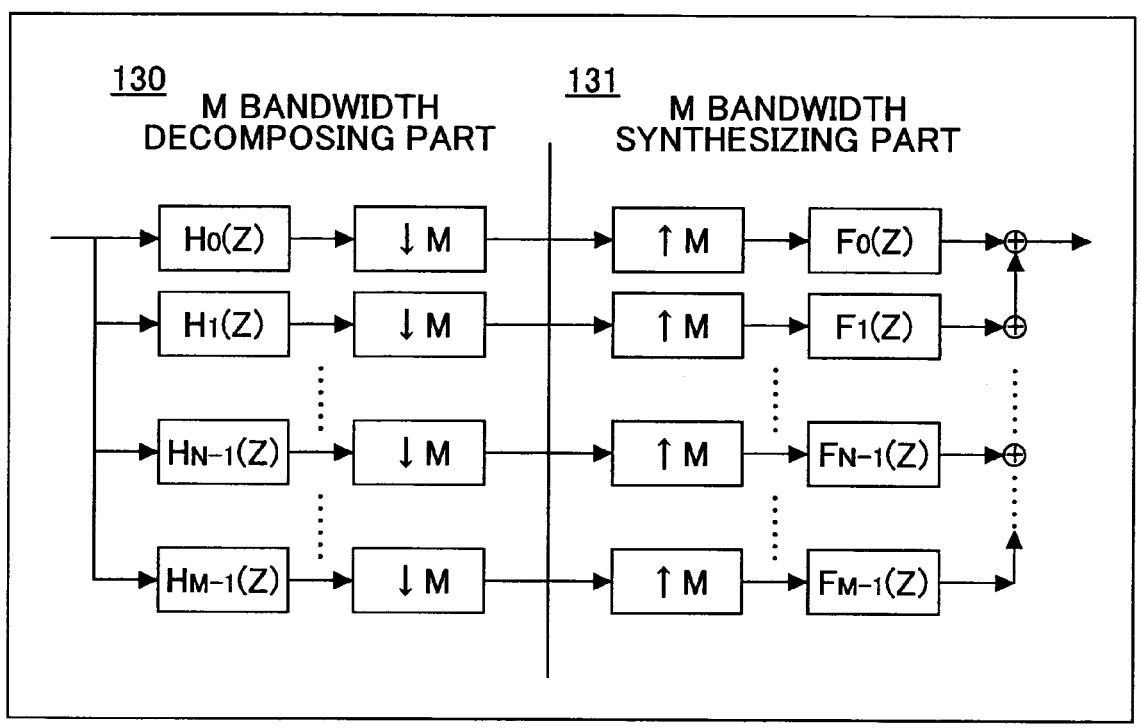
FIG. 19 shows a block diagram of a general uniform decomposition filter bank used when the resolution conversion is not performed.

Normally, when resolution conversion is not performed, the bandwidth synthesizing part 114 restores the image by using filter banks the number of which is the same as that of the decomposed subbands as shown in FIG. 19. Each of signals that are upsampled M times passes through a synthesizing filter having a bandwidth $2\pi/M$, and the signals are added so that an output is obtained. In this case, the spatial resolution of the output image is the same as the spatial resolution of the original image.

To obtain an image of a resolution of N/M times with respect to the original image, the synthesizing filter bank is configured like one shown in the right side (51) in FIG. 9. That is, resolution conversion of N/M times can be realized by using a N decomposing synthesizing filter bank. The signals that are upsampled N times pass through each synthesizing filter having a bandwidth of $2\pi/N$, and are added so that an output is obtained. The output, is an image having a spatial resolution of N/M of the original image.

In the coded code extraction part 110 in FIG. 17 in which only necessary portions are extracted from the compressed data, resolution levels of data to be extracted can be explicitly designated to the decoder, or can be automatically calculated by the decoder from a resolution of a display in the decoding side. In the following, the method of automatically calculating the resolution levels to be extracted is described.

To calculate necessary resolution levels, information (1)-(4) of the header and resolution (K (vertical)×L (horizontal)) of the original image are necessary. By writing the resolution of the original image into the header in addition to the information (1)-(4), the above-mentioned pieces of information can be obtained from the header. Instead of using the header, transmitting and receiving of the information can be performed by an application that uses the encoder and the decoder.

Here, as a most general example, a calculation method is described in a case where the splitting numbers of the vertical direction and the horizontal direction are the same and the resolution levels are set at even intervals. It is assumed that an aspect ratio (length-to-width resolution ration of image) of the original image is the same as that of the decoded image. In addition, it is assumed that the resolution of the display of the decoding side is X (vertical)×Y (horizontal).

Figures 20, 21:
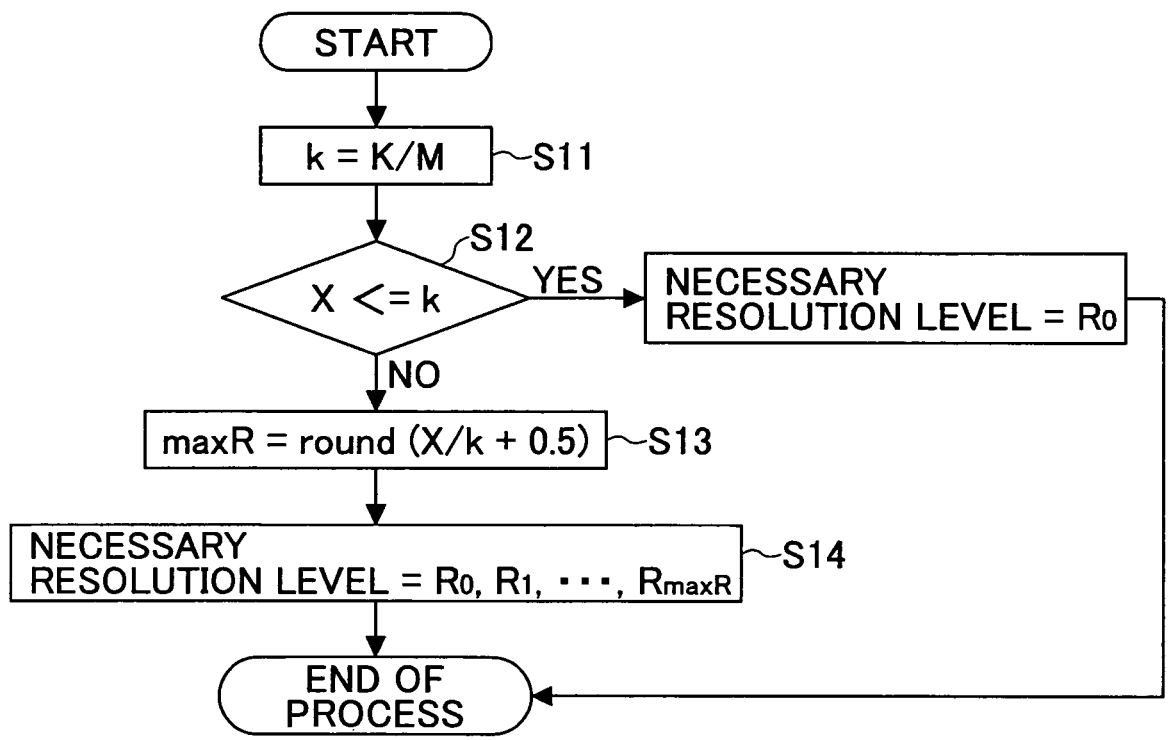
FIG. 20 is a flowchart for automatically calculating a necessary resolution level.
FIG. 21 shows an example of necessary resolution levels calculated when conversion ratios are different between the vertical direction and the horizontal direction.

In this case, the necessary resolution levels are calculated by a procedure of a flowchart in FIG. 20.

First, in step 11, a size of a resolution corresponding to one resolution level is calculated. Next, in step 12, the resolution of the decoded image is compared with the size of the resolution corresponding to one resolution level obtained in step 11. If the resolution of the decoded image is no more than the size of the resolution corresponding to one resolution level, the necessary resolution level is set to be $R_0$ and the process ends. If the resolution of the decoded image is more than the size of the resolution corresponding to one resolution level, the process goes to step 13.

In step 13, an index maxR of a maximum necessary resolution level is calculated. In the figure, "round ( )" indicates a truncating operator. Then, in step 14, necessary resolution levels=$R_0, R_1, \ldots, R_{maxR}$ are determined and the process ends.

In a case where the conversion ratios of the vertical direction and the horizontal direction are different as shown in FIG. 16, the processes of steps 11-13 are performed for each of the vertical direction and the horizontal direction independently. In this case, assuming that indexes of necessary maximum resolution levels for the vertical direction and the horizontal direction are maxRX and maxRY, respectively, the necessary resolution levels are as shown in FIG. 21.

In the case where the extraction of the compressed data is performed in the encoder side, not in the decoder side, the encoder side obtains the resolution of the display apparatus screen of the decoder side, and calculates resolution levels to be extracted.

Fifth Embodiment

Figure 22:
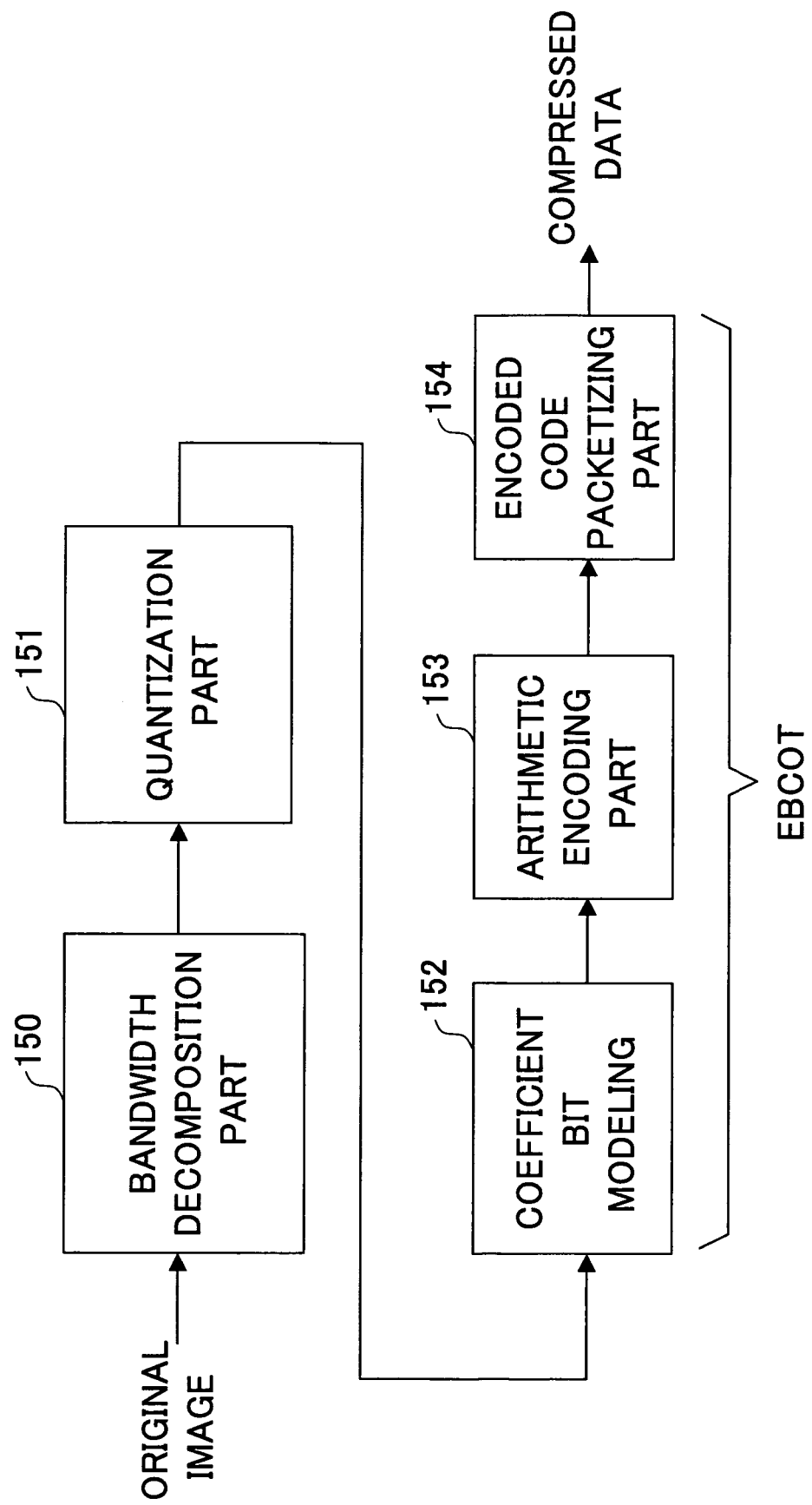
FIG. 22 is a block diagram of an encoder in a fifth embodiment of the present invention.

In this embodiment, an encoder is described in a case where DCT is used as an image decomposition method. FIG. 22 shows a configuration of the encoder according to this embodiment.

The encoder shown in the figure includes a bandwidth decomposition part 150 by DCT, a quantization part 151, and an embedded type entropy encoding part (152-154).

A bandwidth decomposition method in the bandwidth decomposition part 150 in the embodiment is described with reference to FIG. 23. In bandwidth decomposition by DCT, the original image is divided into small blocks each having a size of M×M, and DCT conversion is performed in each small block. In the quantization part 151, the DCT coefficients are quantized. In the same way as the third embodiment, by using EBCOT as the encoding method, control of the compressed data amount can be performed without performing quantization. Thus, quantization can be omitted. Processes in the embedded type entropy encoding part are substantially the same as those described in the third embodiment.

Figure 24:
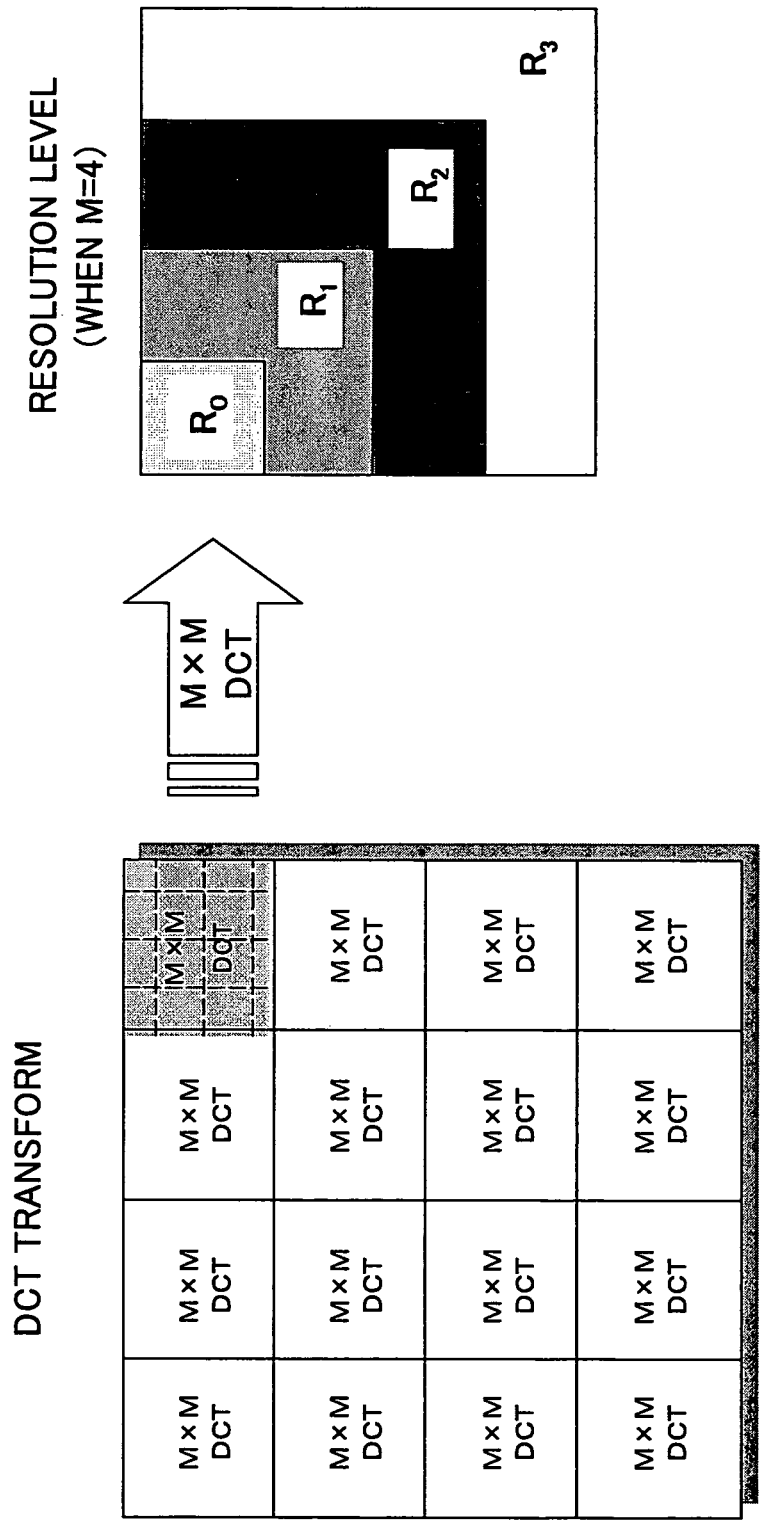
FIG. 24 is a figure showing a defining method of spatial resolution levels in the fifth embodiment.

When bandwidth decomposition is performed by DCT conversion, the spatial resolution levels are defined in a way shown in FIG. 24. The resolution level is set for each small block (M×M order DCT conversion), so that the resolution levels are set as $R_0, R_1, \ldots, R_{M-1}$ from a low frequency DCT coefficient toward a high frequency DCT coefficient.

Sixth Embodiment

Figure 25:
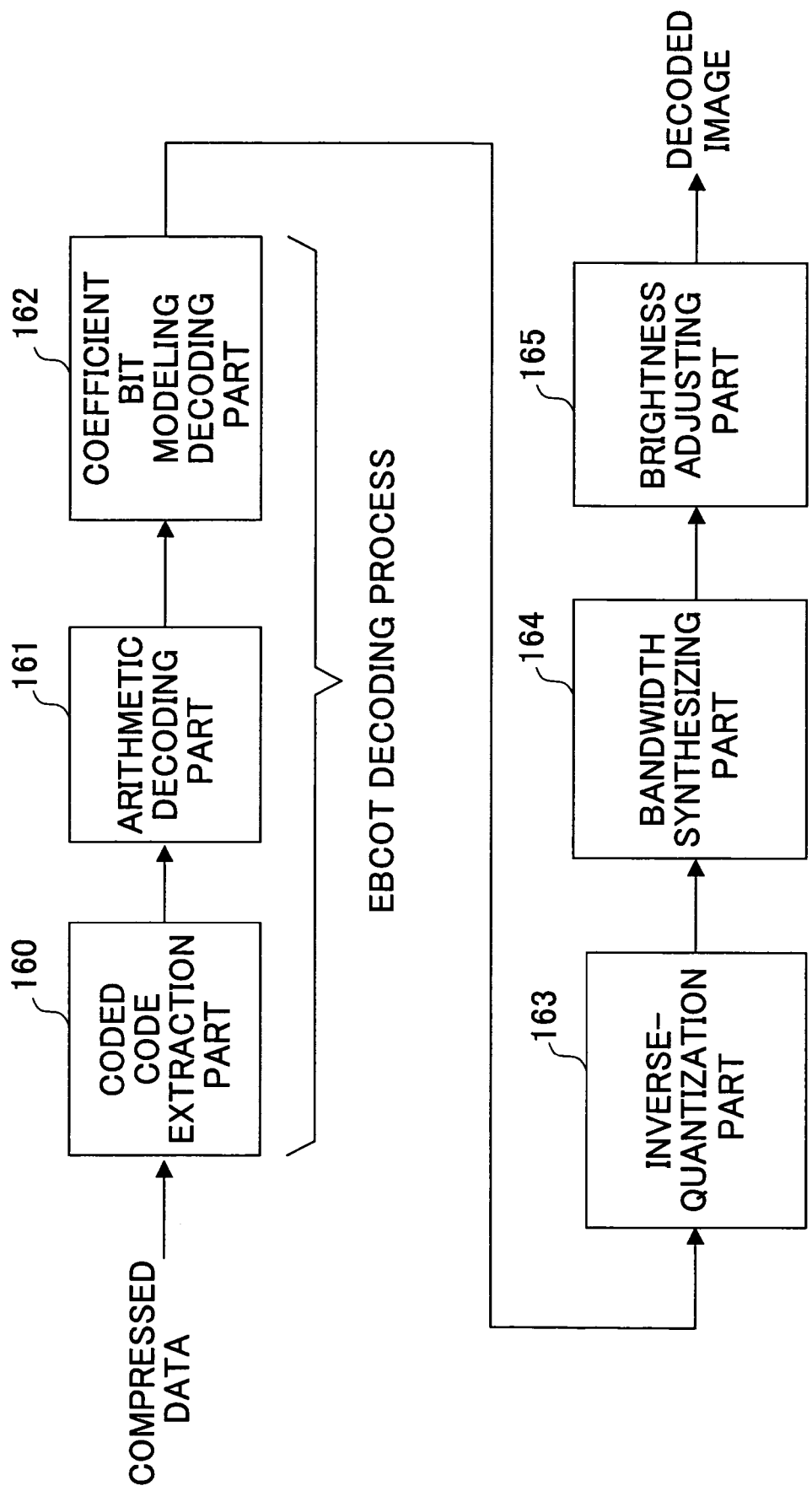
FIG. 25 is a block diagram of a decoder in a sixth embodiment of the present invention.
Figure 26:
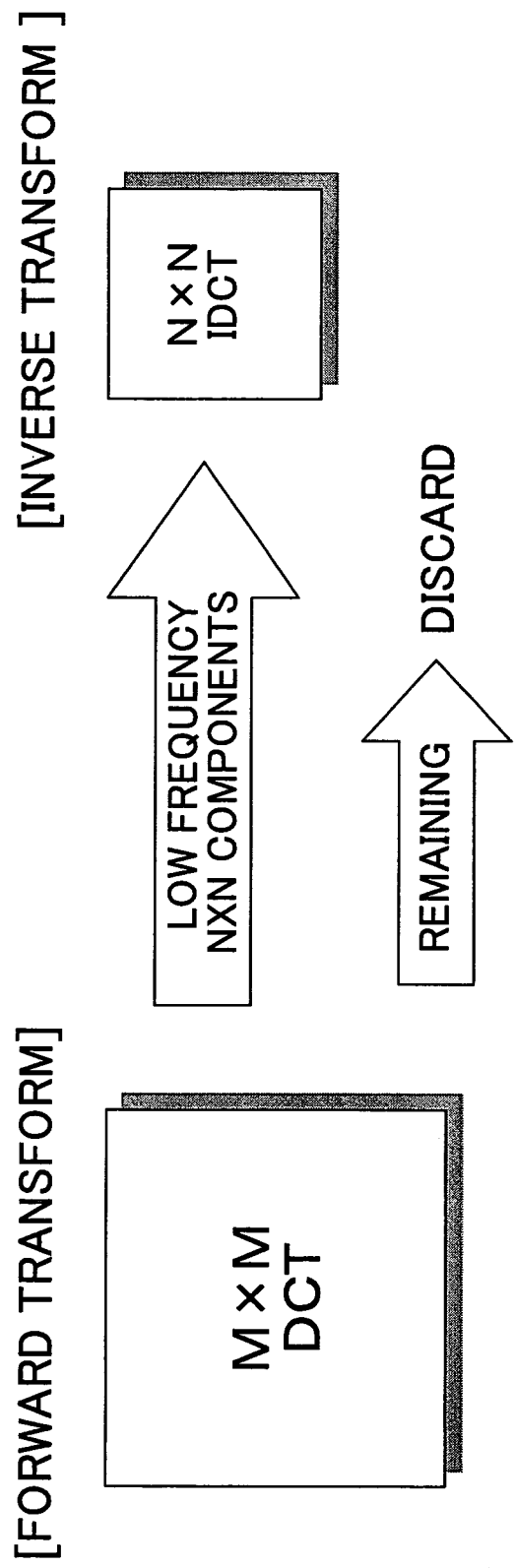
FIG. 26 is a figure for explaining processes in a bandwidth synthesizing part in the decoder in the sixth embodiment.

In this embodiment, a decoder for decoding compressed data that are encoded by the encoder in the fifth embodiment is described. FIG. 25 shows the configuration.

The decoder shown in the figure includes an EBCOT decoding processing part 160-162, an inverse quantization part 163, a bandwidth synthesizing part 164 by IDCT (inverse DCT conversion), and a brightness adjustment part 165.

The coded code extraction part 160 in the EBCOT decoding processing part, in the same way as the fourth embodiment, extracts data to which priorities are assigned in coding by an amount necessary for decoding. The extracted compressed data are arithmetically decoded, are coefficient-bit-modeling-decoded, and inverse-quantized. After that, the compressed data are input into the bandwidth synthesizing part (IDCT) 164.

In normal DCT conversion to IDCT conversion that does not accompany resolution conversion, the order in encoding and the order in decoding are set to be the same. That is, inverse transform of DCT transform of M×M is equal to IDCT transform of M×M.

On the other hand, according to the present invention, to obtain an image of a resolution of N/M times with respect to the original image, IDCT transform of N×N order is performed for N×N DCT coefficients in a low frequency side. Coefficients other than the N×N coefficients are discarded. This processing is performed for each small block. Finally, the brightness adjustment part 165 performs brightness adjustment, so that an image having a spatial resolution of N/M times the original image is output.

The processes described in the first to sixth embodiments can be realized by using hardware including logic circuits, or can be realized by using a program. When realizing the embodiments by using a program, processes described in each embodiment are written as a program, and the program is installed in a computer having a CPU, a memory, a hard disk, a communication apparatus and the like. Then, the program is executed. The program can be recorded in a recording medium such as a CD-ROM, a memory and the like which can be distributed.

Seventh Embodiment

Figure 27:
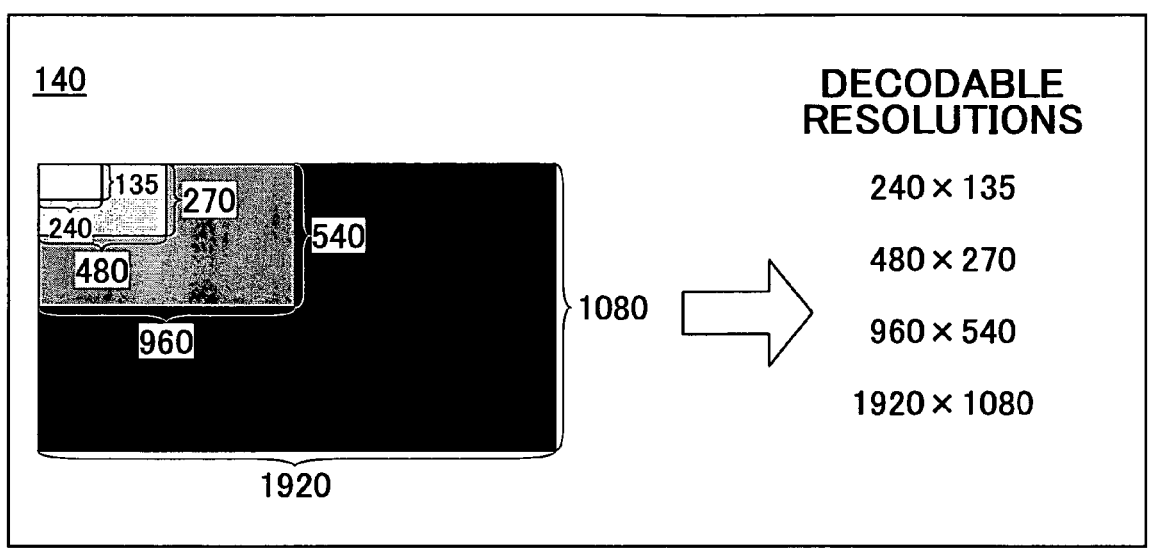
FIG. 27 is a figure for explaining resolutions that can be decoded when an image is encoded by JPEG 2000.

An application example of the present invention is described in this embodiment. As an example, resolutions that can be decoded are described in a case where a HDTV image of 1920×1080 pixels is encoded by using the method of the present invention. For comparison, an example is shown in FIG. 27 in which the image is encoded by JPEG 2000. When the number of decomposition levels is set to be 3, decodable resolutions are $1/2^n$ (n=1, 2, 3) of the original image, respectively, for the vertical direction and horizontal direction. Therefore, decodable resolutions are as follows:

240×135
480×270
960×540
1902×1080

Thus, a SDTV image that is widely distributed cannot be decoded.

Figure 28:
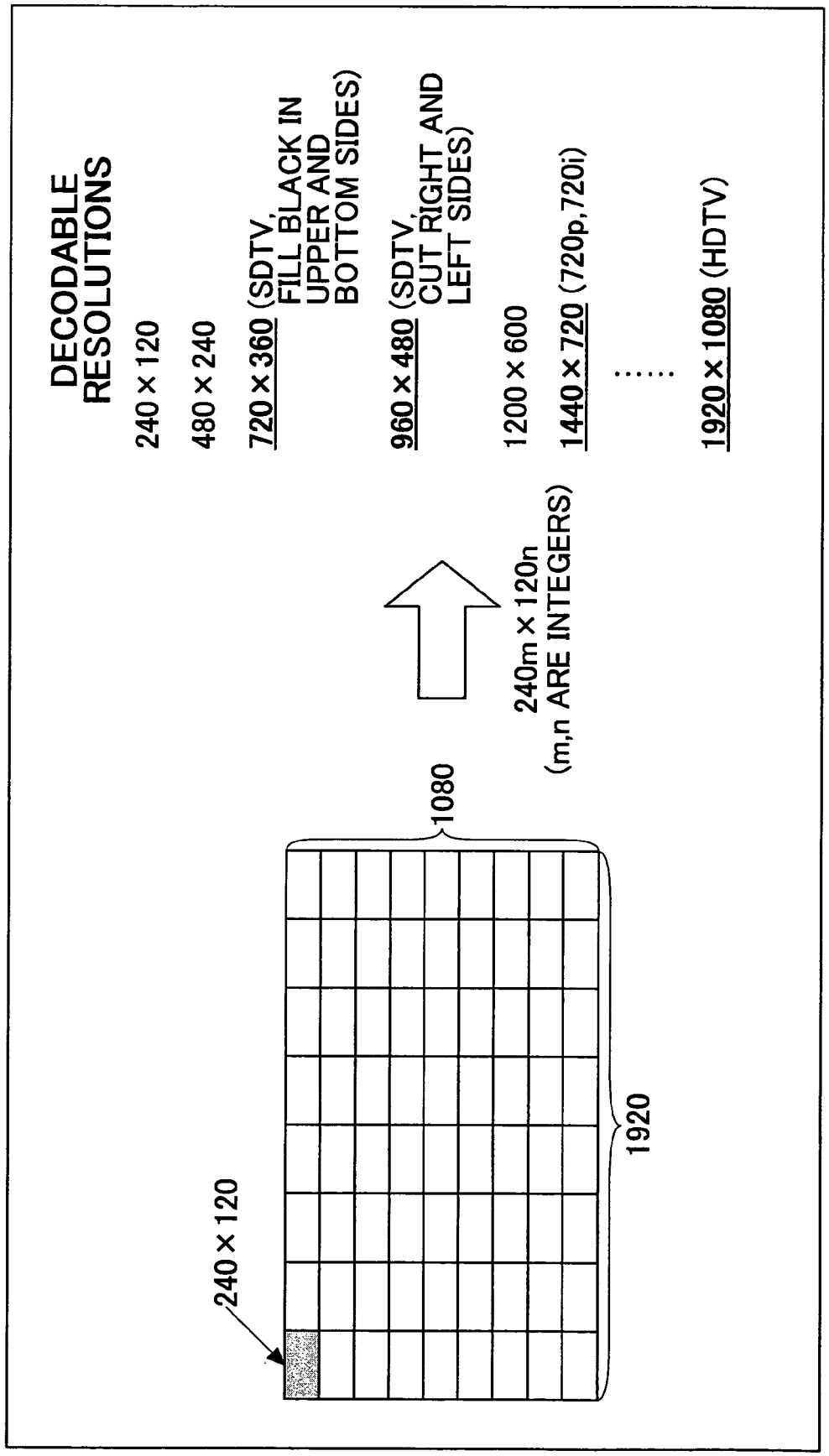
FIG. 28 is a figure showing resolution levels that can be decoded when a HDTV image is encoded in a seventh embodiment of the present invention.

On the other hand, decodable resolutions are shown in FIG. 28 in a case where an HDTV image of 1920×1080 is encoded by the present invention. In the example, the number of divisions in the horizontal direction is set to be 8 levels and the number of divisions in the vertical direction is set to be 9 levels such that the decodable minimum resolution becomes almost the same as the resolution of the above-mentioned JPEG 2000. In this case, the decodable minimum resolution is 240×120 pixels, so that, generally, images of 240m×120n (n, m are positive integers, n=1, 2, . . . , 8, m=1, 2, . . . , 9) pixels can be decoded. In this case, the widely distributed following images can be easily decoded from one compressed file.

720×360 (SDTV, filling black in upper and bottom sides)
960×480 (SDTV, cutting right and left sides)
1440×720 (720p, 720i)
1920×1080 (HDTV)

Figure 29:
FIG. 29 is an original image used in a simulation.
Figure 30A:
FIG. 30 is a decoded image in the simulation.
Figure 30B:
Figure 30C:
Figure 30D:

Next, a simulation result using a method of the present invention is shown. In the simulation, an original image (SIDBA standard image) shown in FIG. 29 is encoded by using the encoding method of the present invention, and the encoded data are decoded into various resolutions by using the decoding method of the present invention. FIG. 30 shows decoded images. Parameters for encoding in the simulation are as follows: number of subbands-decomposition of analyzing filter bank: 4×4; number of subbands-decomposition of synthesizing filter banks: 1×1, 2×2 and 3×3; number of tile: 1; number of layers: 1; size of a code block: 64×64. The compression ratio of the encoder is 1/5, and code size after compression is 12705 bytes.

FIG. 31 shows code sizes of decoded images, and PSNR (Peak Signal to Noise Ratio) characteristics obtained by comparing each resolution image with a reference image of a corresponding resolution. The reference image is an image obtained by performing resolution conversion of an image ideally. The value in the parentheses for each resolution indicates a bit number bpp (bits per pixel) reduced to a value per one pixel. That is, the value in the parentheses is a value obtained by dividing a necessary number of bits for decoding each resolution image by the corresponding resolution. As shown in FIG. 31, good PSNR characteristics are obtained, and it can be understood that the decoded images obtained by the present invention exhibit small deterioration.

As mentioned above, according to the present invention, image encoding can be performed efficiently, so that the coded image can be stored with a small disk capacity. Since spatial resolution scalability is provided, the image can be decoded with a spatial resolution suitable for performance or usage of the image display apparatus. By decoding the image from a low frequency to a desired frequency, an image having a spatial resolution lower than that of the original image can be reproduced. By decoding all data, an image having a resolution the same as that of the original image can be reproduced. To obtain an image of a spatial resolution lower than that of the original image according to performance or usage of the image display apparatus, it is only necessary to decode encoded data corresponding to necessary bandwidths. The processing time of the present invention is shorter than that in a case where first an image of a resolution the same as that of the original image is decoded, and, then, resolution conversion is performed. In addition, since the coded bit stream can be transmitted by transmitting only necessary data, the transmission rate becomes small. In addition, a decoded image having a resolution of a size other than $1/2^n$ times resolution of the original image can be obtained.

The present invention is not limited to the specifically disclosed embodiments, and variations and modifications may be made without departing from the scope of the invention.

The invention claimed is:

1. A decoding method of decoding, using a decoding apparatus having a processor, coded data with a resolution of N/M times (M and N are integers, and $1 \leq N < M$ and $M > 2$) that of an original image, the decoding method comprising:

a decoding step of receiving the coded data that are encoded by decomposing the original image into M uniform subbands using an analysis filter bank that includes M filters of the same bandwidth and M 1/M-times downsampling units, extracting N signals from decomposed signals from a low frequency side, and decoding, using the decoding apparatus, the N signals by using an entropy decoding method; and a bandwidth synthesizing step of synthesizing the N signals, that are decoded to obtain an image of the resolution of N/M times that of the original image, by using a synthesizing filter bank that includes N N-times upsampling units and N filters of the same bandwidth, wherein the coded data includes information of resolution levels defined from the low frequency side in ascending order of subband in the decomposed subbands, and the decoding step includes a calculation step of obtaining a resolution of the original image and a predetermined resolution, and calculating the value N suitable for the predetermined resolution by using the resolution of the original image and the decomposition number M.

2. The decoding method as claimed in claim 1, the decoding method further comprising an inverse quantization step of inverse-quantizing the signals obtained by the decoding step, wherein signals that are obtained by the inverse quantization step are synthesized in the bandwidth synthesizing step.

3. The decoding method as claimed in claim 1, wherein EBCOT used in still image international standard JPEG 2000 is used as the entropy decoding method in the decoding step, and a uniform decomposing filter bank is used in the bandwidth synthesizing step.

4. A decoding method of decoding, using a decoding apparatus having a processor, coded data with a resolution of N/M times (M and N are integers, and $1 \leq N < M$ and $M > 2$) that of an original image, the decoding method comprising:

a decoding step of receiving the coded data that are encoded by decomposing the original image into M coefficients of frequency components using M×M order DCT, extracting N signals from decomposed signals from a low frequency component side, and decoding, using the decoding apparatus, the N signals by using an entropy decoding method; and a bandwidth synthesizing step of synthesizing the N signals, that are decoded to obtain an image of the resolution of N/M times that of the original image, by using N×N order IDCT.

5. A decoding apparatus for decoding coded data with a resolution of N/M times (M and N are integers, and $1 \leq N < M$ and $M > 2$) that of an original image, the decoding apparatus comprising:

a decoding part receiving the coded data that are encoded by decomposing the original image into M uniform subbands using an analysis filter bank that includes M filters of the same bandwidth and M 1/M-times downsampling units, extracting N signals from decomposed signals from a low frequency side, and decoding the N signals by using an entropy decoding method; and a bandwidth synthesizing part synthesizing the N signals, that are decoded to obtain an image of the resolution of N/M times that of the original image, by using a synthesizing filter bank that includes N N-times upsampling units and N filters of the same bandwidth, wherein the coded data includes information of resolution levels defined from the low frequency side in ascending order of subband in the decomposed subbands, and the decoding part further includes a calculation part obtaining a resolution of the original image and a predetermined resolution, and calculating the value N suitable for the predetermined resolution by using the resolution of the original image and the decomposition number M.

6. The decoding apparatus as claimed in claim 5, the decoding apparatus further comprising an inverse quantization part inverse-quantizing the signals obtained by the decoding part, wherein signals that are obtained by the inverse quantization part are synthesized in the bandwidth synthesizing part.

7. The decoding apparatus as claimed in claim 5, wherein EBCOT used in still image international standard JPEG 2000 is used as the entropy decoding method in the decoding part, and a uniform decomposing filter bank is used in the bandwidth synthesizing part.

8. A decoding apparatus of decoding coded data with a resolution of N/M times (M and N are integers, and $1 \leq N < M$ and $M > 2$) that of an original image, the decoding apparatus comprising:
   a decoding part receiving the coded data that are encoded by decomposing the original image into M coefficients of frequency components using M×M order DCT, extracting N signals from decomposed signals from a low frequency component side, and decoding the N signals by using an entropy decoding method; and
   a bandwidth synthesizing part synthesizing the N signals, that are decoded to obtain an image of the resolution of N/M times that of the original image, by using N×N order IDCT.

9. A non-transitory computer readable recording medium that records a program for causing a computer to perform decoding processes for decoding coded data with a resolution of N/M times (M and N are integers, and $1 \leq N < M$ and $M > 2$) that of an original image, wherein the program causes the computer to perform:
   a decoding step of receiving the coded data that are encoded by decomposing the original image into M uniform subbands using an analysis filter bank that includes M filters of the same bandwidth and M 1/M-times downsampling units, extracting N signals from decomposed signals from a low frequency side, and decoding the N signals by using an entropy decoding method; and
   a bandwidth synthesizing step of synthesizing the N signals, that are decoded to obtain an image of the resolution of N/M times that of the original image, by using a synthesizing filter bank that includes N N-times upsampling units and N filters of the same bandwidth,
   wherein the coded data includes information of resolution levels defined from the low frequency side in ascending order of subband in the decomposed subbands, and
   the decoding step includes a calculation step of obtaining a resolution of the original image and a predetermined resolution, and calculating the value N suitable for the predetermined resolution by using the resolution of the original image and the decomposition number M.

10. The non-transitory computer readable recording medium as claimed in claim 9, the program further causing the computer to perform an inverse quantization step of inverse-quantizing the signals obtained by the decoding step, wherein signals that are obtained by the inverse quantization step are synthesized in the bandwidth synthesizing step.

11. A non-transitory computer readable recording medium that records a program for causing a computer to perform decoding processes for decoding coded data with a resolution of N/M times (M and N are integers, and $1 \leq N < M$ and $M > 2$) that of an original image, wherein the program causes the computer to perform:
   a decoding step of receiving the coded data that are encoded by decomposing the original image into M coefficients of frequency components using M×M order DCT, extracting N signals from decomposed signals from a low frequency component side, and decoding the N signals by using an entropy decoding method; and
   a bandwidth synthesizing step of synthesizing the N signals, that are decoded to obtain an image of the resolution of N/M times that of the original image, by using N×N order IDCT.

\* \* \* \* \*